United States Patent [19]
Irie et al.

[11] Patent Number: 5,930,382
[45] Date of Patent: Jul. 27, 1999

[54] WIRING PATTERN INSPECTING METHOD AND SYSTEM FOR CARRYING OUT THE SAME

[75] Inventors: Yoko Irie, Kawasaki; Hideaki Doi, Oota-ku; Yasuhiko Hara, Machida; Tadashi Iida, Isehara; Yasuhiro Fujishita, Hadano; Yasuo Nakagawa, Chigasaki; Takanori Ninomiya, Hiratsuka, all of Japan

[73] Assignee: Hitachi, Ltd., Tokyo, Japan

[21] Appl. No.: 08/645,475

[22] Filed: May 13, 1996

[30] Foreign Application Priority Data

May 15, 1995 [JP] Japan .................................. 7-116030
Jan. 25, 1996 [JP] Japan .................................. 8-010753

[51] Int. Cl.⁶ .............................. G06K 9/00; G06K 9/42; G06K 9/32
[52] U.S. Cl. .......................... 382/147; 382/141; 382/258; 382/298
[58] Field of Search .................................... 382/147, 149, 382/141, 145, 146, 150, 190, 258, 298, 259; 378/99, 58, 901, 54, 53, 157

[56] References Cited

U.S. PATENT DOCUMENTS

| | | | |
|---|---|---|---|
| 4,654,583 | 3/1987 | Ninomiya et al. | 356/394 |
| 4,809,308 | 2/1989 | Adam et al. | 378/99 |
| 4,853,967 | 8/1989 | Mandeville | 382/147 |
| 4,953,224 | 8/1990 | Ichinose et al. | 382/141 |
| 5,272,763 | 12/1993 | Maruyama et al. | 382/141 |
| 5,301,248 | 4/1994 | Takanori et al. | 382/141 |
| 5,754,621 | 5/1998 | Suzuki et al. | 378/57 |

FOREIGN PATENT DOCUMENTS

| | | | |
|---|---|---|---|
| 59-192945 | 11/1984 | Japan | G01N 21/88 |
| 61-86638 | 5/1986 | Japan | G06K 9/00 |
| 62-131391 | 6/1987 | Japan | G06K 9/62 |
| 1-230183 | 9/1989 | Japan | G06F 15/66 |
| 5-215694 | 8/1993 | Japan | G01N 21/88 |
| 06188092 | 7/1994 | Japan | H05G 1/00 |
| 7-43320 | 2/1995 | Japan | G01N 23/04 |

*Primary Examiner*—Jose L. Couso
*Assistant Examiner*—Duy M. Dang
*Attorney, Agent, or Firm*—Antonelli, Terry, Stout & Kraus, LLP

[57] ABSTRACT

A wiring pattern inspecting method comprises irradiating a test object provided with wiring patterns formed in a plurality of layers with x-rays, obtaining a variable-density image signal corresponding to the thickness of the wiring patterns superposed in a plurality of layers including superposed sections of the wiring patterns, extracting a plurality of image signals, the number of which corresponding to that of the superposed wiring patterns, from the variable-density image signal, and comparing end point information or isolated point information about the wiring patterns obtained from image signal representing a larger number of superposed wiring patterns, and branch information about the end points or the isolated points on the wiring points, obtained from the extracted image signal representing a smaller number of superposed wiring patterns to inspect the wiring patterns for defects in the wiring patterns. The wiring pattern inspecting method is carried out by a wiring pattern inspecting system.

32 Claims, 20 Drawing Sheets

J: NUMBER OF THREE-BRANCH JOINTS IN THE RANGE
K: NUMBER OF END POINTS IN THE RANGE

| CONDITION DECISION 0 : ONLY BASE BOARD 1 : WIRING PATTERN X : Don't cara | | X 0 X 0 1 0 1 1 1 |
|---|---|---|
| OUT-PUT | CONDITION IS MET | 0 |
| | CONDITION IS NOT MET | VALUE (1 or 0) OF THE CENTER PIXEL OF INPUT 3×3 PIXELS |

| CONDITION DECISION<br>0 : ONLY BASE BOARD<br>1 : WIRING PATTERN<br>X : Don't care | | X 0 X<br>0 1 0<br>X 1 X |
|---|---|---|
| OUT-<br>PUT | CONDITION IS MET | 0 |
| | CONDITION IS NOT MET | VALUE (1 or 0) OF THE CENTER PIXEL OF INPUT 3×3 PIXELS |

| | No. | T |
|---|---|---|
| CONDITION DECISION<br>0 : ONLY BASE BOARD<br>1 : WIRING PATTERN<br>X : Don't cara | 1 | 1 1 1<br>1 1 1<br>1 1 1 |
| OUT-PUT — CONDITION IS MET | | 1 |
| OUT-PUT — CONDITION IS NOT MET | | 0 |

| CONDITION DECISION<br>0 : ONLY BASE BOARD<br>1 : WIRING PATTERN<br>X : Don't cara | No. | T |
|---|---|---|
| | 1 | 0 0 0<br>0 0 0<br>0 0 0 |
| OUT-PUT | CONDITION IS MET | 0 |
| | CONDITION IS NOT MET | 1 |

1801

FIG. 24a
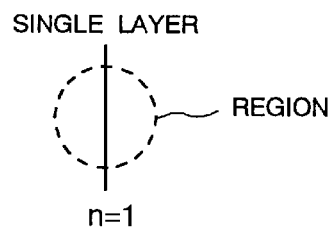
FIG. 24b    FIG. 24c    FIG. 24d
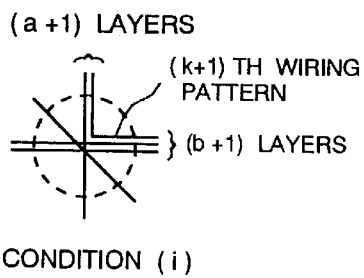
CONDITION (i)
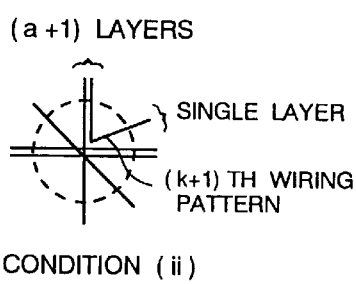
CONDITION (ii)
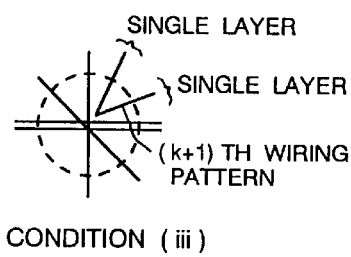
CONDITION (iii)

WIRING PATTERN INSPECTING METHOD AND SYSTEM FOR CARRYING OUT THE SAME

BACKGROUND OF THE INVENTION

The present invention relates to a wiring pattern inspecting method and a system for carrying out the same using an electromagnetic wave, such as x-rays, or an ultrasonic wave and capable of inspecting wiring patterns (circuit patterns) formed in a plurality of layers on a printed wiring board or the like for chipped defects including internal defects, and nodular defects (three-dimensional defects).

A wiring pattern inspecting technique disclosed in JP-A No. 5-215694, JP-A No. 7-43320 (corresponding to U.S. application Ser. No. 08/212763), now U.S. Pat. No. 5,754,621 (Prior art 1) is capable of accurately inspecting a wiring pattern (circuit pattern) formed on a printed wiring board for defects in the direction of thickness (three-dimensional defects) including chipped defects on the bottom of the wiring pattern by using, for example, an x-ray transmission image in distinction from a case where there is no wiring pattern.

A wiring pattern inspecting technique for detecting disconnection defects including virtual disconnection defects, and short circuit defects including virtual short circuit defects in a wiring pattern disclosed in JP-A No. 59-192945 (corresponding to U.S. Pat. No. 4,654,583), JP-A No. 61-86638 (corresponding to U.S. Pat. No. 4,953,224), JP-A No. 1-230183 (coresponding to U.S. Pat. No. 5,301,248) (Prior art 2) comprises taking an optical image of a printed wiring pattern, converting the optical image into an electric signal (image signal), converting the electric signal (image signal) into a binary image signal, examining the relation in connection between two selected points (aimed points) to produce connection data expressing the relation in connection by a pair of numbers assigned to the selected points, and comparing the connection data with reference data expressing the numbers assigned to the points in the relation in connection produced on the basis of design information or the like in a circular list structure.

A wiring pattern inspecting technique for inspecting a wiring pattern for defects disclosed in JP-A No. 62-131391 (Prior art 3) comprises extracting singular points on skeletal lines of a wiring pattern (circuit pattern), such as end points of the skeletal lines and branching points, storing the coordinates of the singular points as information about the inspected wiring pattern, reading out coordinate information about the coordinates of the singular points, and comparing the coordinate information with reference coordinate information about reference singular points extracted from a reference wiring pattern to detect disconnection defects and short circuit defects from the difference between the wiring pattern formed on the printed wiring board and the reference wiring pattern. An X-ray imaging system is disclosed in Japanese Application Laid-Open No. 06-188092.

All those prior art techniques take nothing into consideration about surely inspecting wiring patterns superposed on a printed wiring board or the like for defects without overlooking internal defects (three-dimensional defects) that occur on the bottom of the wiring patterns.

SUMMARY OF THE INVENTION

The present invention has been made to solve problems in the prior art techniques and it is therefore an object of the present invention to provide a wiring pattern inspecting method and a system for carrying out the same capable of surely inspecting wiring patterns for internal chipped defects and nodular defects (three-dimensional defects) that occur on the bottoms of wiring patterns even if the wiring patterns are superposed on a printed wiring board or the like without overlooking any defects by using an electromagnetic wave, such as x-rays, or an ultrasonic wave.

Another object of the present invention is to provide a wiring pattern inspecting method and a system for carrying out the same capable of surely inspecting wiring patterns for internal chipped defects and nodular defects (three-dimensional defects) that occur on the bottoms of the wiring patterns even if the wiring patterns are superposed on a printed wiring board or the like without overlooking any defects by using x-rays.

With the foregoing objects in view, the present invention provides a wiring pattern inspecting method comprising irradiating a test object provided with wiring patterns formed in a plurality of layers with x-rays, obtaining a variable-density image signal (a gray scale image signal) corresponding to the thickness of the wiring patterns superposed in a plurality of layers including superposed sections of the wiring patterns, extracting a plurality of image signals which correspond to superposed number of the wiring pattern layers, from said obtained variable-density image signal by using a binarizing circuit, and inspecting defect (chipped defect and nodular defect) of the wiring pattern in the superposed wiring pattern layers by comparing end point information or isolated point information of a wiring pattern obtained from the extracted image signal representing a superposed larger number in the wiring pattern layers by using an end point extracting circuit or an isolated point extracting circuit, and branch information of a wiring pattern about the end point or the isolated point obtained from the extracted image signal representing a superposed small number in the wiring pattern by using a branch joint extracting circuit.

The present invention provides a wiring pattern inspecting method comprising irradiating a test object provided with wiring patterns formed in a plurality of layers, obtaining a variable-density image signal (a gray scale image signal) corresponding to the thickness of the wiring patterns superposed in a plurality of layers including the superposed wiring patterns of the wiring patterns with x-rays, extracting a plurality of image signals which correspond to superposed number of the wiring pattern layers, from said obtained variable-density image signal by using a binarizing circuit, extracting a plurality of skeletal image signals representing skeletal image lines from the plurality of extracted image signals by using a skeletal image extracting circuit, and inspecting defect (chipped defect and nodular defect) of the wiring pattern in the superposed wiring pattern layers by comparing end point information or isolated point information of a wiring pattern obtained from the extracted skeletal image signal representing a superposed larger number in the wiring pattern layers by using an end point extracting circuit or an isolated point extracting circuit, and branch information of a wiring pattern about the end point or the isolated point obtained from the extracted skeletal image signal representing a superposed small number in the wiring pattern by using a branch joint extracting circuit.

The present invention provides a wiring pattern inspecting method comprising irradiating a test object provided with wiring patterns formed in a plurality of layers with x-rays, obtaining an x-ray transmission variable-density image signal corresponding to the thickness of the wiring patterns superposed in a plurality of layers including superposed sections of the wiring patterns by detecting x-rays transmitted by the test object, extracting a plurality of image signals which correspond to superposed number of the wiring pattern layers, from said obtained variable-density image signal by using a binarizing circuit, and inspecting defect of the wiring pattern in the superposed wiring pattern layers by comparing end point information or isolated point information of a wiring pattern obtained from the extracted image signal representing a superposed larger number in the wiring pattern layers by using an end point extracting circuit or an isolated point extracting circuit, and branch information of a wiring pattern about the end point or the isolated point obtained from the extracted image signal representing a superposed small number in the wiring pattern by using a branch joint extracting circuit.

The present invention provides a wiring pattern inspecting method comprising irradiating a test object provided with wiring patterns formed in a plurality of layers with x-rays, obtaining an x-ray transmission variable-density image signal corresponding to the thickness of the wiring patterns superposed in a plurality of layers including superposed sections of the wiring patterns by detecting x-rays transmitted by the test object, extracting a plurality of image signals which correspond to superposed number of the wiring pattern layers, from said obtained variable-density image signal by using a binarizing circuit, extracting a plurality of skeletal image signals representing skeletal lines from the plurality of extracted image signals by using a skeletal image extracting circuit, and inspecting defect of the wiring pattern in the superposed wiring pattern layers by comparing end point information or isolated point information of a wiring pattern obtained from the extracted skeletal image signal representing a superposed larger number in the wiring pattern layers by using an end point extracting circuit or an isolated point extracting circuit, and branch information of a wiring pattern about the end point or the isolated point obtained from the extracted skeletal image signal representing a superposed small number in the wiring pattern by using a branch joint extracting circuit.

The present invention provides a wiring pattern inspecting method comprising irradiating a test object provided with wiring patterns formed in a plurality of layers with x-rays, obtaining an x-ray transmission variable-density image signal corresponding to the thickness of the wiring patterns superposed in a plurality of layers including superposed sections of the wiring patterns by detecting x-rays transmitted by the test object, converting the x-ray transmission variable-density image signal into a digital image signal, binarizing the digital image signal by using a plurality of thresholds which correspond to superposed number of the wiring pattern layers for a binarizing circuit, to extract a plurality of binary image signals which correspond to the superposed number, and inspecting defect of the wiring pattern in the superposed wiring pattern layers by comparing end point information or isolated point information of a wiring pattern obtained from the extracted binary image signal representing a superposed larger number in the wiring pattern layers by using an end point extracting circuit or an isolated point extracting circuit, and branch information of a wiring pattern about the end point or the isolated point obtained from the extracted binary image signal representing a superposed small number in the wiring pattern by using a branch joint extracting circuit.

The present invention provides a wiring pattern inspecting method comprising irradiating a test object provided with wiring patterns formed in a plurality of layers with x-rays, obtaining an x-ray transmission variable-density image signal corresponding to the thickness of the wiring patterns superposed in a plurality of layers including superposed sections of the wiring patterns by detecting x-rays transmitted by the test object, converting the x-ray transmission variable-density image signal into a digital image signal, binarizing the digital image signal by using a plurality of thresholds which correspond to superposed number of the wiring pattern layers for a binarizing circuit, to extract a plurality of binary image signals which correspond to the superposed number, extracting a plurality of skeletal image signals representing skeletal lines from the plurality of extracted binary image signals by using a skeletal image extracting circuit, and inspecting defect of the wiring pattern in the superposed wiring pattern layers by comparing end point information or isolated point information of a wiring pattern obtained from the extracted skeletal image signal representing a superposed larger number in the wiring pattern layers by using an end point extracting circuit or an isolated point extracting circuit, and branch information of a wiring pattern about the end point or the isolated point obtained from the extracted skeletal image signal representing a superposed small number in the wiring pattern by using a branch joint extracting circuit.

The present invention provides a wiring pattern inspecting method comprising irradiating a test object provided with wiring patterns formed in a plurality of layers with x-rays, obtaining a variable-density image signal (a gray scale image signal) corresponding to the thickness of the wiring patterns superposed in a plurality of layers including superposed sections of the wiring patterns, extracting a plurality of image signals which correspond to superposed number of the wiring pattern layers, from said obtained variable-density image signal by using a binarizing circuit, and inspecting defect (chipped defect and nodular defect) of the wiring pattern in the superposed wiring pattern layers by comparing between a plurality of connection relations, each of the connection relations representing connection relation on each wiring pattern obtained from each of the extracted image signals.

The present invention provides a wiring pattern inspecting method comprising irradiating a test object provided with wiring patterns formed in a plurality of layers with x-rays, obtaining a variable-density image signal (a gray scale image signal) corresponding to the thickness of the wiring patterns superposed in a plurality of layers including superposed sections of the wiring patterns, extracting a plurality of image signals which correspond to superposed number of the wiring pattern layers, from said obtained variable-density image signal by using a binarizing circuit, extracting a plurality of skeletal image signals which correspond to superposed number of the wiring pattern layers, from said obtained variable-density image signal by using a binarizing circuit, extracting a plurality of skeletal image signals representing skeletal lines from the plurality of extracted image signals by using a skeletal image extracting circuit, and inspecting defect (chipped defect and nodular defect) of the wiring pattern in the superposed wiring pattern layers by comparing between a plurality of connection relations, each of the connection relations representing connection relation on each skeletal wiring pattern obtained from each of the extracted skeletal image signals.

The present invention provides a wiring pattern inspecting method comprising irradiating a test object provided with wiring patterns formed in a plurality of layers with x-rays, obtaining an x-ray transmission variable-density image signal corresponding to the thickness of the wiring patterns superposed in a plurality of layers including superposed sections of the wiring patterns by detecting x-rays transmitted by the test object, extracting a plurality of image signals which correspond to superposed number of the wiring pattern layers, from said obtained variable-density image signal by using a binarizing circuit, and inspecting defect of the wiring pattern in the superposed wiring pattern layers by comparing between a plurality of connection relations, each of the connection relations representing connection relation on each wiring pattern obtained from each of the extracted image signals.

The present invention provides a wiring pattern inspecting method comprising irradiating a test object provided with wiring patterns formed in a plurality of layers with x-rays, obtaining an x-ray transmission variable-density image signal corresponding to the thickness of the wiring patterns superposed in a plurality of layers including superposed sections of the wiring patterns by detecting x-rays transmitted by the test object, extracting a plurality of image signals which correspond to superposed number of the wiring pattern layers, from said obtained variable-density image signal by using a binarizing circuit, extracting a plurality of skeletal image signals representing skeletal lines from the plurality of extracted image signals by using a skeletal image extracting circuit, and inspecting defect (chipped defect and nodular defect) of the wiring pattern in the superposed wiring pattern layers by comparing between a plurality of connection relations, each of the connection relations representing connection relation on each skeletal wiring pattern obtained from each of the extracted skeletal image signals.

The present invention provides a wiring pattern inspecting method comprising irradiating a test object provided with wiring patterns formed in a plurality of layers with x-rays, obtaining an x-ray transmission variable-density image signal corresponding to the thickness of the wiring patterns superposed in a plurality of layers including superposed sections of the wiring patterns by detecting x-rays transmitted by the test object, converting the x-ray transmission variable-density image signal into a digital image signal, binarizing the digital image signal by using a plurality of thresholds which correspond to superposed number of the wiring pattern layers for a binarizing circuit, to extract a plurality of binary image signals which correspond to the superposed number, and inspecting defect of the wiring pattern in the superposed wiring pattern layers by comapring between a plurality of connection relations, each of the connection relations representing connection relation on each wiring pattern obtained from each of the extracted image signals.

The present invention provides a wiring pattern inspecting method comprising irradiating a test object provided with wiring patterns formed in a plurality of layers with x-rays, obtaining an x-ray transmission variable-density image signal corresponding to the thickness of the wiring patterns superposed in a plurality of layers including superposed sections of the wiring patterns by detecting x-rays transmitted by the test object, converting the x-ray transmission variable-density image signal into a digital image signal, binarizing the digital image signal by using a plurality of thresholds which correspond to superposed number of the wiring pattern layers for a binarizing circuit, to extract a plurality of binary image signals which correspond to the superposed number, extracting a plurality of skeletal image signals representing skeletal lines from the plurality of extracted binary image signals by using a skeletal image extracting circuit, and inspecting defect of the wiring pattern in the superposed wiring pattern layers by comparing between a plurality of connection relations, each of the connection relations representing connection relation on each skeletal wiring pattern obtained from each of the extracted skeletal image signals.

The present invention provides a wiring pattern inspecting system comprising an x-ray irradiation means for irradiating a test object provided with wiring patterns formed in a plurality of layers with x-rays, an x-ray variable-density image signal detecting means for detecting a variable-density image signal corresponding to the thickness of the wiring patterns superposed in a plurality of layers including superposed sections of the wiring patterns from the x-rays emitted by the x-ray irradiation means, and a defect detecting and processing means for extracting a plurality of image signals which correspond to superposed number of the wiring pattern layers, from said variable-density image signal obtained by the x-ray variable-density image signal detecting means, and inspecting defect (chipped defect and nodular defect) of the wiring pattern in the superposed wiring pattern layers by comparing end point information or isolated point information of a wiring pattern obtained from the extracted image sgianl representing a superposed larger number in the wiring pattern layers by an end point extracting circuit or an isolated point extracting circuit, and branch information of a wiring pattern about the end point or the isolated point obtained from the extracted image signal representing a superposed small number in the wiring pattern by a branch joint extracting circuit.

The present invention provides a wiring pattern inspecting system comprising an x-ray irradiation means for irradiating a test object provided with wiring patterns formed in a plurality of layers with x-rays, an x-ray variable-density image signal detecting means for detecting a variable-density image signal corresponding to the thickness of the wiring patterns superposed in a plurality of layers including superposed sections of the wiring patterns from the x-rays emitted by the x-ray irradiation means, and a defect detecting and processing means for extracting a plurality of image signals which correspond to superposed number of the wiring pattern layers, from said variable-density image signal obtained by the x-ray variable-density image signal detecting means, extracting a plurality of skeletal image signals representing skeletal lines from the plurality of extracted image signals by a skeletal image extracting circuit, and inspecting defect (chipped defect and nodular defect) of the wiring pattern in the superposed wiring pattern layers by comparing end point information or isolated point information of a wiring pattern obtained from the extracted skeletal image signal representing a superposed larger number in the wiring pattern layers by an end point extracting circuit or an isolated point extracting circuit, and branch information of a wiring pattern about the end point or the isolated point obtained from the extracted skeletal image signal representing a superposed small number in the wiring pattern by a branch joint extracting circuit.

The present invention provides a wiring pattern inspecting system comprising an x-ray irradiation means for irradiating a test object provided with wiring patterns formed in a plurality of layers with x-rays, an x-ray transmission variable-density image signal detecting means for detecting an x-ray transmission variable-density image signal corresponding to the thickness of the wiring patterns superposed in a plurality of layers including superposed sections of the wiring patterns by detecting x-rays transmitted by the test object, and a defect detecting and processing means for extracting a plurality of image signals which correspond to superposed number of the wiring pattern layers, from said variable-density image signal obtained by the x-ray variable-density image signal detecting means, and inspecting defect of the wiring pattern in the superposed wiring pattern layers by comparing end point information or isolated point information of a wiring pattern obtained from the extracted image signal representing a superposed larger number in the wiring pattern layers by an end point extracting circuit or an isolated point extracting circuit, and branch information of a wiring pattern about the end point or the isolated point obtained from the extracted image signal representing a superposed small number in the wiring pattern by a branch joint extracting circuit.

The present invention provides a wiring pattern inspecting system comprising an x-ray irradiation means for irradiating a test object provided with wiring patterns formed in a plurality of layers with x-rays, an x-ray transmission variable-density image signal detecting means for detecting an x-ray transmission variable-density image signal corresponding to the thickness of the wiring patterns superposed in a plurality of layers including superposed sections of the wiring patterns by detecting x-rays transmitted by the test object, and a defect detecting and processing means for extracting a plurality of image signals which correspond to superposed number of the wiring pattern layers, from said variable-density image obtained by the x-ray variable-density image signal detecting means, extracting a plurality of skeletal image signals representing skeletal lines from the plurality of extracted image signals, and inspecting defect of the wiring pattern in the superposed wiring pattern layers by comparing end point information or isolated point information of a wiring pattern obtained from the extracted skeletal image signal representing a superposed larger number in the wiring pattern layers by an end point extracting circuit or an isolated point extracting circuit, and branch information of a wiring pattern about the end point or the isolated point obtained from the extracted skeletal image signal representing a superposed small number in the wiring pattern by a branch joint extracting circuit.

The present invention provides a wiring pattern inspecting system comprising an x-ray irradiation means for irradiating a test object provided with wiring patterns formed in a plurality of layers with x-rays, an x-ray transmission variable-density image signal detecting means for detecting an x-ray transmission variable-density image signal corresponding to the thickness of the wiring patterns superposed in a plurality of layers including superposed sections of the wiring patterns by detecting x-rays transmitted by the test object from the x-rays emitted by the x-ray irradiation means, and a defect detecting and processing means for converting the x-ray transmission variable-density image signal obtained by the x-ray transmission variable-density image signal detecting means, into a digital image signal, binarizing the digital image signal by using a plurality of thresholds which correspond to superposed number of the wiring pattern layers for a binarizing circuit, to extract a plurality of binary image signals which correspond to the superposed number, and inspecting defect of the wiring pattern in the superposed wiring pattern layers by comapring end point information or isolated point information of a wiring pattern obtained from the extracted binary image signal representing a superposed larger number in the wiring pattern layers by an end point extracting circuit or an isolated point extracting circuit, and branch information of a wiring pattern about the end point or the isolated point obtained from the extracted binary image signal representing a superposed small number in the wiring pattern by a branch joint extracting circuit.

The present invention provides a wiring pattern inspecting system comprising an x-ray irradiation means for irradiating a test object provided with wiring patterns formed in a plurality of layers with x-rays, an x-ray transmission variable-density image signal detecting means for detecting an x-ray transmission variable-density image signal corresponding to the thickness of the wiring patterns superposed in a plurality of layers including superposed sections of the wiring patterns by detecting x-rays transmitted by the test object, and a defect detecting and processing means for converting the x-ray transmission variable-density image signal obtained by the x-ray transmission variable-density image signal detecting means, into a digital image signal, binarizing the digital image signal by using a plurality of thresholds which correspond to superposed number of the wiring pattern layers for a binarizing circuit, to extract a plurality of binary image signals which correspond to the superposed number, extracting a plurality of skeletal image signals representing skeletal lines from the plurality of extracted binary image signals, and inspecting defect of the wiring pattern in the superposed wiring pattern layers by comparing end point information or isolated point information of a wiring pattern obtained from the extracted skeletal image signal representing a superosed larger number in the wiring pattern layers by an end point extracting circuit or an isolated point extracting circuit, and branch information of a wiring pattern about the end point or the isolated point obtained from the extracted skeletal image signal representing a superposed small number in the wiring pattern by a branch joint extracting circuit.

The present invention provides a wiring pattern inspecting system comprising an x-ray irradiation means for irradiating a test object provided with wiring patterns formed in a plurality of layers with x-rays, an x-ray variable-density image signal detecting means for detecting a variable-density image signal corresponding to the thickness of the wiring patterns superposed in a plurality of layers including superposed sections of the wiring patterns, and a defect detecting and processing means for extracting a plurality of image signals which correspond to superposed number of the wiring pattern layers, from said variable-density image signal obtained by the x-ray transmission variable-density image signal detecting means, and inspecting defect (chipped defect and nodular defect) of the wiring pattern in the superposed wiring pattrn layers by comparing between a plurality of connection relations, each of the connection relations representing connection relation on each wiring pattern obtained from each of the extracted image signals.

The present invention provides a wiring pattern inspecting system comprising an x-ray irradiation means for irradiating a test object provided with wiring patterns formed in a plurality of layers with x-rays, an x-ray variable-density image signal detecting means for detecting a variable-density image signal corresponding to the thickness of the wiring patterns superposed in a plurality of layers including superposed sections of the wiring patterns, and defect detecting and processing means for extracting a plurality of image signals which correspond to superposed number of the wiring pattern layers, from said variable-density image signal obtained by the x-ray transmission variable-density image signal detecting means, extracting a plurality of skeletal image signals representing skeletal lines from the plurality of extracted image signals, and inspecting defect (chipped defect and nodular defect) of the wiring pattern in the superposed wiring pattern layers by comparing between a plurality of connection relations, each of the connection relations representing connection relation on each skeletal wiring pattern obtained from each of the extracted skeletal image signals.

The present invention provides a wiring pattern inspecting system comprising an x-ray irradiation means for irradiating a test object provided with wiring patterns formed in a plurality of layers with x-rays, an x-ray transmission variable-density image signal detecting means for detecting an x-ray transmission variable-density image signal corresponding to the thickness of the wiring patterns superposed in a plurality of layers including superposed sections of the wiring patterns by detecting x-rays transmitted by the test object, and a defect detecting and processing means for extracting a plurality of image signals which correspond to superposed number of the wiring pattern layers, from said variable-density image signal obtained by the x-ray transmission variable-density image signal detecting means, and inspecting defect of the wiring pattern in the superposed wiring pattern layers by comparing between a plurality of connection relations, each of the connection relations representing connection relation on each wiring pattern obtained from each of the extracted image signals.

The present invention provides a wiring pattern inspecting system comprising an x-ray irradiation means for irradiating a test object provided with wiring patterns formed in a plurality of layers with x-rays, an x-ray transmission variable-density image signal detecting means for detecting an x-ray transmission variable-density image signal corresponding to the thickness of the wiring patterns superposed in a plurality of layers including superposed sections of the wiring patterns by detecting x-rays transmitted by the test object, and defect detecting and processing means for extracting a plurality of image signals which correspond to superposed number of the wiring pattern layers, from said variable-density image signal obtained by the x-ray transmission variable-density image signal detecting means, extracting a plurality of skeletal image signals representing skeletal lines from the plurality of extracted image signals, and inspecting defect of the wiring pattern in the superposed wiring pattern layers by comparing between a plurality of connection relations, each of the connection reltions representing connection relation on each skeletal wiring pattern obtained from each of the extracted skeletal image signals.

The present invention provides a wiring pattern inspecting system comprising an x-ray irradiation means for irradiating a test object provided with wiring patterns formed in a plurality of layers with x-rays, an x-ray transmission variable-density image signal detecting means for detecting an x-ray transmission variable-density image signal corresponding to the thickness of the wiring patterns superposed in a plurality of layers including superposed sections of the wiring patterns by detecting x-rays transmitted by the test object, and a defect detecting and processing means for converting the x-ray transmission variable-density image signal obtained by the x-ray transmission variable-density image signal detecting means, into a digital image signal, binarizing the digital image signal by using a plurality of thresholds which correspond to superposed number of the wiring pattern layers for a binarizing circuit, to extract a plurality of binary image signals which correspond to the superposed number, and inspecting defect of the wiring pattern in the superposed wiring pattern layers by comparing between a plurality of connection relations, each of the connection relations representing connection relation on each wiring pattern obtained from each of the extracted binary image signals.

The present invention provides a wiring pattern inspecting system comprising an x-ray irradiation means for irradiating a test object provided with wiring patterns formed in a plurality of layers with x-rays, an x-ray transmission variable-density image signal detecting means for detecting an x-ray transmission variable-density image signal corresponding to the thickness of the wiring patterns superposed in a plurality of layers including superposed sections of the wiring patterns by detecting x-rays transmitted by the test object, and a defect detecting and processing means for converting the x-ray transmission variable-density image signal obtained by the x-ray transmission variable-density image signal detecting means, into a digital image signal, binarizing the digital image signal by using a plurality of thresholds which correspond to superposed number of the wiring pattern layers for a binarizing circuit, to extract a plurality of binary image signals which correspond to the superposed number, extracting a plurality of skeletal image signals representing skeletal lines from the plurality of extracted binary image signals, and inspecting defect of the wiring pattern in the superposed wiring pattern layers by comparing between a plurality of connection relations, each of the connection relations representing connection relation on each skeletal wiring pattern obtained from each of the extracted skeletal image signals.

The present invention provides a wiring pattern inspecting system comprising a wave generating means for emitting an electromagnetic or ultrasonic wave toward a test object provided with wiring patterns, and a defect detecting and processing means for processing an image signal representing an image of the wiring patterns and obtained by detecting the electromagnetic or ultrasonic wave emitted by the wave generating means to detect internal defects in the wiring patterns on the basis of the relation in connection of the wiring pattern.

The present invention provides a wiring pattern inspecting system comprising an image signal detecting means for detecting an image signal representing an image of wiring patterns formed on a test object and obtained from the test object, and a defect detecting and processing means for processing the image signal provided by the image signal detecting means to detect internal defects in the wiring patterns on the basis of the relation in connection of the wiring patterns.

The wiring pattern inspecting system obtains an image of a board provided with wiring patterns on the front and the back surface thereof, extracts a double-layer wiring pattern image of superposed sections of the wiring patterns from the image of the board by using information about a variable-density image of the wiring patterns, and detects defects from the relation in connection between the double-layer wiring pattern image and a single-layer wiring pattern image of nonsuperposed sections of the wiring patterns.

The wiring pattern inspecting system processes the detected image signal, after extracting the single-layer wiring pattern image and the double-layer wiring pattern image, by an image signal processing operation comprising a first process of detecting breaks, i.e., end points, in the single-layer wiring pattern image as defects, a second process of detecting three-forked joints in the single-layer wiring pattern image not coinciding with breaks, i.e., end points, in the double-layer wiring pattern image as defects, a third process of detecting end points in the double-layer wiring pattern image not coinciding with the three-forked joints in the single-layer wiring pattern image as defects, a fourth process of detecting four-forked joints in the single-layer wiring pattern image not coinciding with points, i.e., isolated points, in the double-layer wiring pattern image as defects, and a fifth process of isolated points in the double-layer wiring pattern image an not coinciding with four-forked joints in the single-layer wiring pattern image as defects.

The wiring pattern inspecting system has a function to correct the dislocation of the single-layer wiring pattern image and the double-layer wiring pattern image relative to each other.

The wiring pattern inspecting system is capable of inspecting a multilayer printed wiring board provided with a plurality of wiring pattern layers superposed one over another, extracts each of wiring pattern images corresponding to the superposed number of the wiring pattern layers by using density information about the wiring pattern images, and detects relations in connection between the extracted wiring pattern images.

The present invention inspects printed wiring boards by the foregoing wiring pattern inspecting method to manufacture acceptable printed wiring boards.

The present invention extracts skeletal lines of each of the plurality of superposed wiring patterns from an x-ray image of the test object, and examines the relation in connection between the skeletal lines to detect chipped defects.

The present invention is capable of detecting chipped defects (three-dimensional defects) including bottom defects (internal defects) or excessive material defects in a plurality of wiring patterns (circuit patterns) formed in layers on a test object (printed wiring board) by using an electromagnetic wave, such as x-rays, or an ultrasonic wave and of achieving the inspection of wiring patterns (circuit patterns) of wiring liens extending in an optional direction of extension and a plurality of wiring patterns formed in layers on a printed wiring board for chipped defects with high reliability.

Since the present invention is capable of surely detecting bottom defects (internal defects) in wiring patterns (circuit patterns), high reliability can be secure for test objects (printed wiring boards) provided with a plurality of wiring patterns (circuit patterns) in layers, and the reliability of products employing the test objects (printed wiring boards) inspected by the present invention can be improved.

BRIEF DESCRIPTION OF THE DRAWINGS

FIGS. 24(a), 24(b), 24(c) and 24(d) are diagrammatic views showing only a single-layer wiring pattern in a region, three modes of lying of a (k+1)th pattern on k pieces of patterns, respectively;

DETAILED DESCRIPTION OF THE PREFERRED EMBODIMENTS

Figure 1:
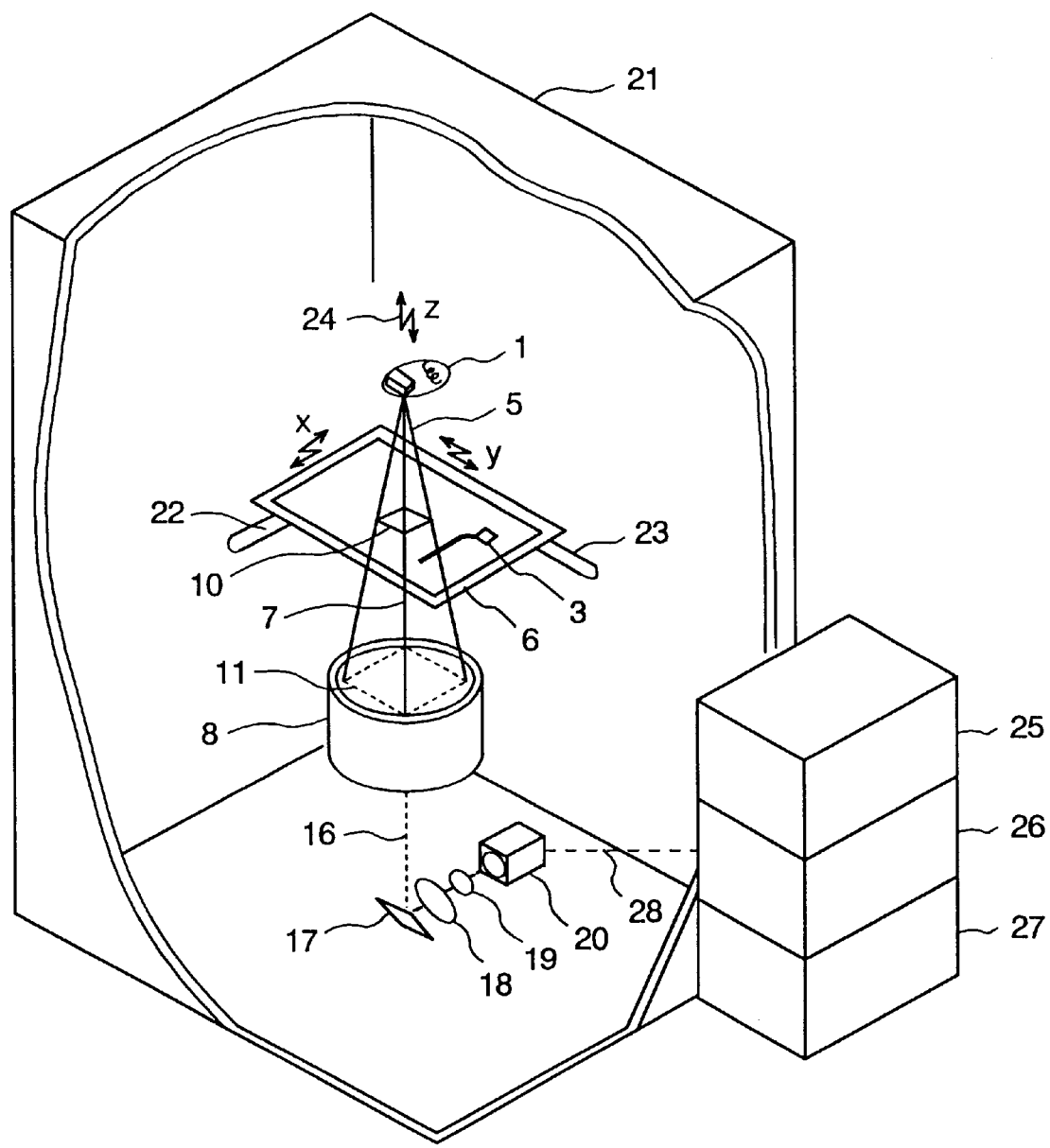
FIG. 1 is a partly cutaway perspective view of a wiring pattern inspecting system in a preferred embodiment according to the present invention.

Referring to FIG. 1 showing a wiring pattern inspecting system in a preferred embodiment according to the present invention including an x-ray inspection unit 21 using x-rays for inspection, x-rays 5 emitted from an x-ray tube 1 fall on a printed wiring board 6, i.e., a test object. A transmission x-ray image 7 of a field 10 of the printed wiring board 6 formed by the x-rays transmitted by the field 10 fall on the light receiving surface 11 of an x-ray image intensifier 8, and the x-ray image intensifier 8 converts the x-ray transmission image 7 into a corresponding optical image 16.

Figure 7:
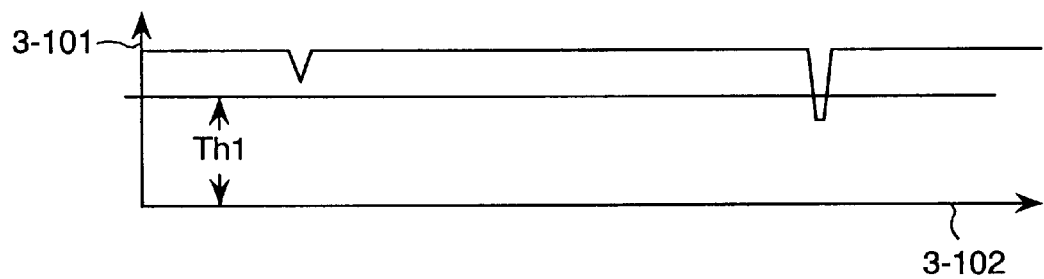
FIG. 7 is a waveform diagram showing the waveform of a signal obtained by scanning the x-ray transmission image of FIG. 6.
Figure 8:
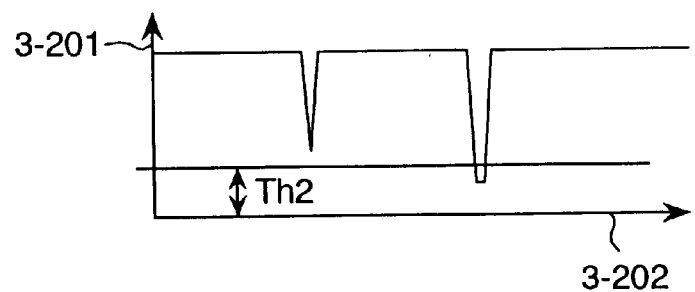
FIG. 8 is a waveform diagram showing the waveform of a signal obtained by scanning the x-ray transmission image of FIG. 6.

The printed wiring board 6 is mounted on an x-stage 22 and a y-stage 23 and is moved in directions along an x-axis and in directions along a y-axis so that an x-ray transmission image of a necessary region (the substantially entire region) thereof can be obtained. The x-ray tube 1 is mounted on a z-stage, not shown, in order that the x-ray tube 1 can be moved in directions 24 along a z-axis to change the magnification of the x-ray transmission image 7 formed on the x-ray image intensifier 8. The position of the x-ray tube 1 may be fixed and the printed wiring board 6 may be mounted on a z-stage to move the printed wiring board 6 in directions along the z-axis. The x-rays being transmitted by the printed wiring board 6 are attenuated by wiring patterns (circuit patterns) 3 formed of a metal by degrees corresponding to the thickness of the wiring patterns 3, so that the x-ray transmission image 7 formed on the x-ray image intensifier 8 is a variable-density image (a gray scale image) having distributed density corresponding to the distribution of the thickness of the wiring patterns 3. The x-rays are absorbed scarcely the base board 202 of the printed wiring board 6 because the base board is made of an organic material. Accordingly, in the optical image 16 obtained by converting the x-ray transmission image 7 by the x-ray image intensifier 8, light portions correspond to the base board 202, dark portions correspond to the wiring lines of the wiring pattern (circuit pattern) 3, and the densities of the dark portions are proportional to the thickness of the corresponding wiring lines. A CCD camera 20 takes the optical image 16 thus formed through a mirror 17, a lens 18 and a shutter 19 and gives an image signal 28 representing the optical image 16 to an image processor 27. In an image processor 27, an A/D converter 29 converts the optical image signal 28 into a corresponding digital image signal 33 representing densities of the optical image signal 28, a level converter 30 subjects the digital image signal 33 to logarithmic transformation, a shading correcting circuit 31 corrects the shading of the digital image signal 33 so that the digital image signal 33 indicating a test portion 201 of the printed wiring board 6 in the field 10 is leveled as shown in FIGS. 7 and 8, a fluorescent distribution correcting circuit 32 converts the shading-corrected digital image signal 33 into a clear digital image signal 34 by an appropriate filtering correction, a defect detecting and processing circuit (defect detecting and processing means) 35 processes the clear digital image signal 34 by a defect detecting algorithm and gives defect data 36 including data on the coordinates and the attributes of defects to a defect data output unit 26. A controller 25 controls the operations of the components of the wiring pattern inspecting system including the x-stage 22, the y-stage 23 and the z-stage. As shown in FIG. 1, the wiring pattern inspecting system has the x-ray inspection unit 21.

Figure 4:
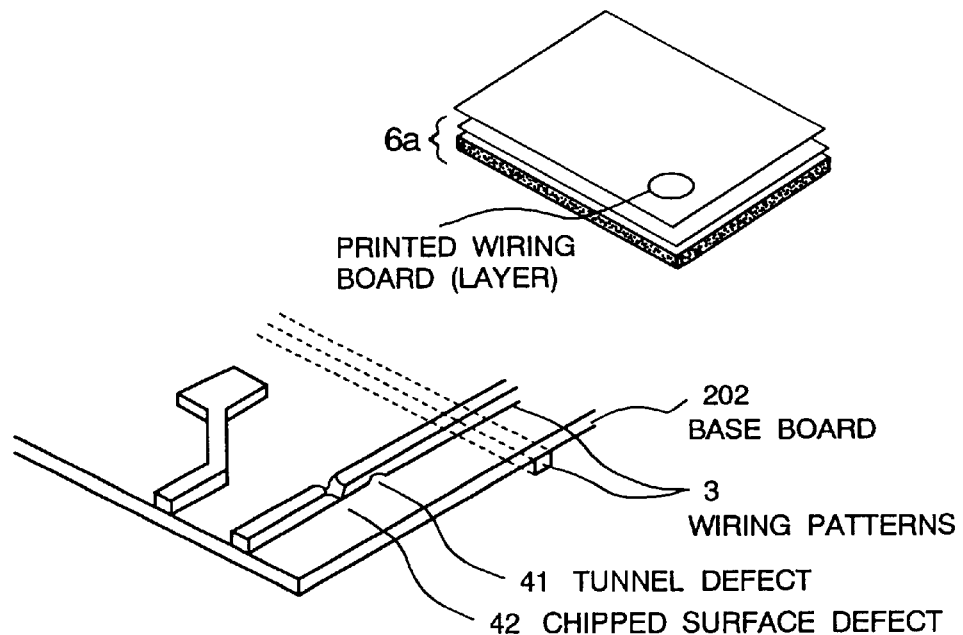
FIG. 4 is a perspective view of a multilayer printed wiring board, i.e., a test object, to be inspected by the present invention.
Figure 5:
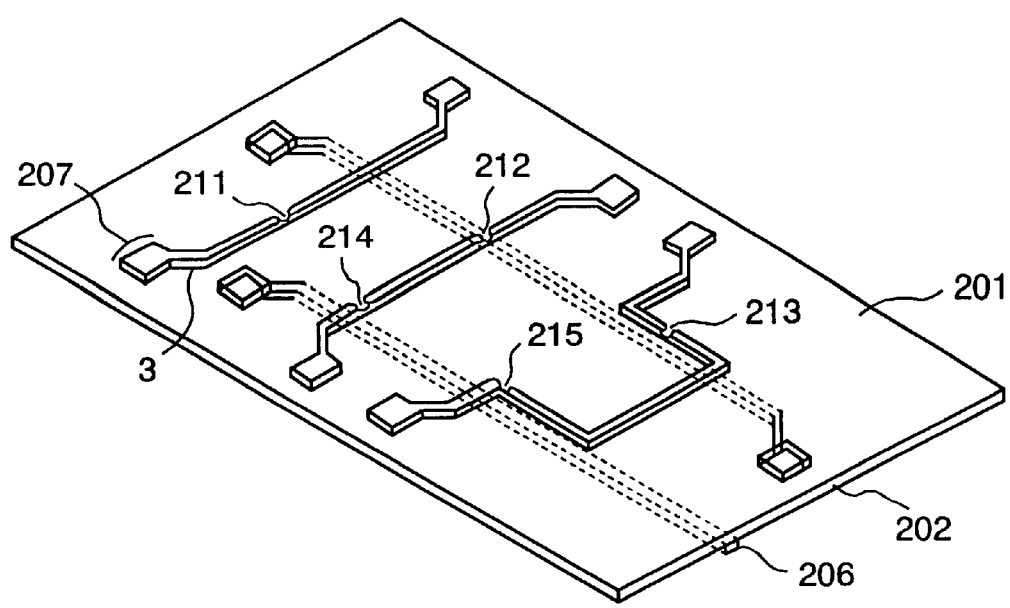
FIG. 5 is a fragmentary perspective view of a printed wiring board, i.e., a test object, to be inspected by the present invention.

The printed wiring board 6, i.e., the test object, has wiring patterns (circuit patterns) 3 of Cu, Mo, W or the like formed on both the surfaces of the base board 202. The test object may be a multilayer printed wiring board 6a formed by stacking a plurality of printed wiring board like the printed wiring board 6 as shown in FIG. 4. Either the printed wiring board 6 or the multilayer printed wiring board 6a is provided with a plurality of wiring pattern layers 3 so that a base board 20 or an insulating layer puts between the wiring pattern layers 3. Defects in the wiring patterns 3 include tunnellike internal defects 41 substantially equivalent to disconnection, and chipped surface defects 42. Portions of the wiring patterns 3 having those defects have a reduced thickness. Referring to FIG. 5 showing the test portion 201 of the printed wiring board 6, the wiring patterns 3 of a metal, such as Cu, Mo, W or the like are formed on the major surfaces of the base board 202 made of an organic material. Generally, density detection signal level G is an exponential function of the material and the thickness of the test object (the printed wiring board) 6, as expressed by Expression (1)

$$G = S \cdot \exp(-\mu t) \qquad (1)$$

where S is the intensity of x-rays on the test object (the printed wiring board) 6, Ê is a constant dependent on the materials of the components of the test object (the printed wiring board) 6, and t is the thickness of the components of the test object (the printed wiring board) 6.

Figure 2:
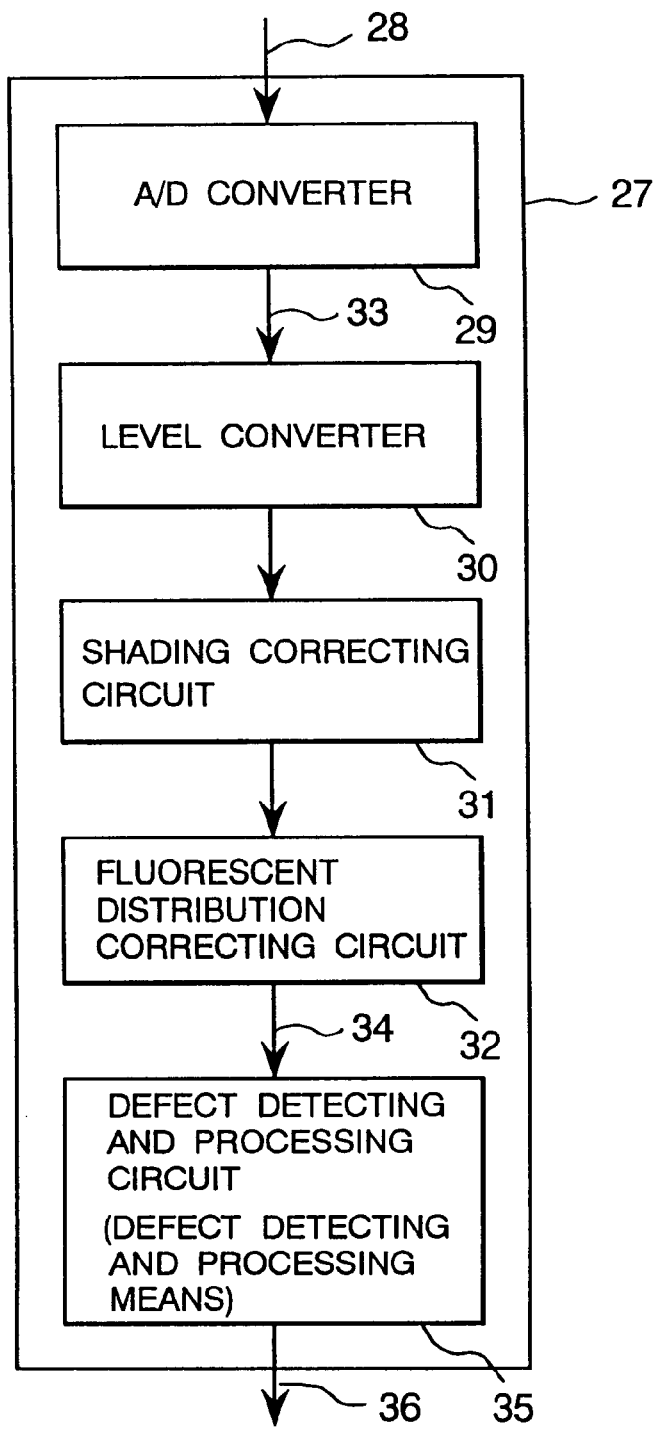
FIG. 2 is a block diagram of an image processing unit included in the wiring pattern inspecting system of FIG. 1.

The level converter 30 shown in FIG. 2 subjects the signal to logarithmic transformation using Expression (2) so that the variable-density image signal level is proportional to the thickness t of the wiring pattern 3 of the test object 6. Therefore, the sensitivity is constant by being proportional to the thickness t of the wiring pattern 3 of the printed wiring board 6, i.e., the test object. Accordingly, when the superposed number of the wiring pattern layers is large, the variable-density image signal (the gray scale image signal) can be easily separated into binary image signal corresponding to the superposed number by using a threshold.

$$\log \alpha \cdot G = \log \alpha \cdot S + (-\mu \cdot t)/\log e \cdot \alpha \qquad (2)$$

As shown in FIG. 5, the wiring patterns (circuit patterns) 3 are formed on both the surfaces of the base board 202. The wiring pattern formed on the back surface is indicated at 206. The wiring lines of the wiring patterns 3 terminate in pads 207. The wiring patterns 3 of a conductive material, such as Cu, have five chipped defects 211, 212, 213, 214 and 215.

Figure 6:
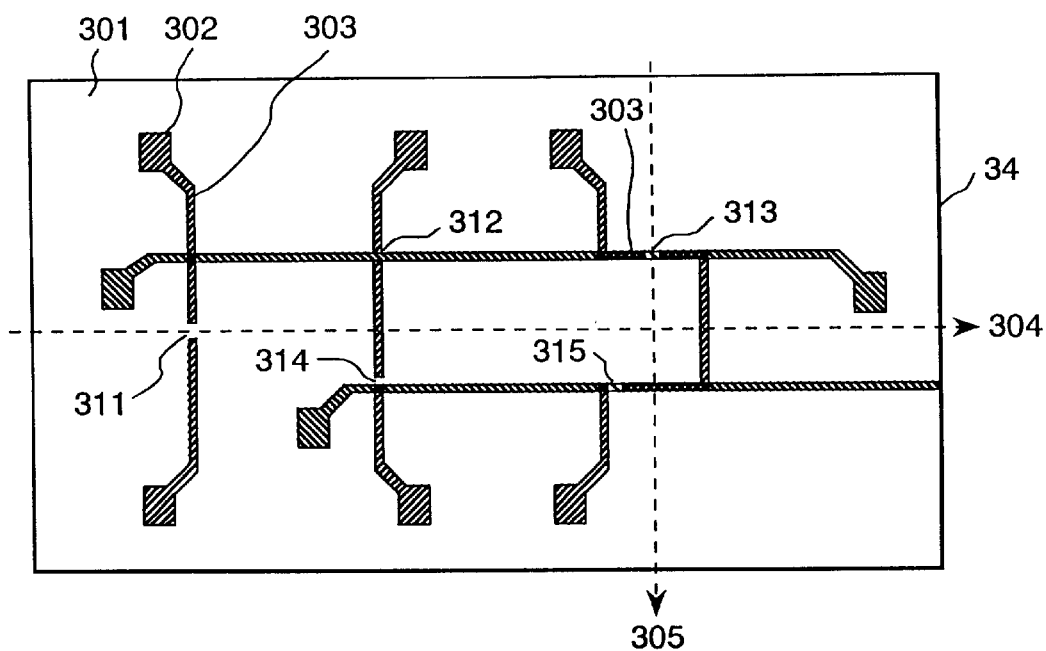
FIG. 6 is a view of an x-ray transmission image of the printed wiring board of FIG. 5.

FIG. 6 shows an x-ray transmission image of the printed wiring board represented by an x-ray variable-density image signal 34 (a digital image signal provided by the fluorescent distribution correcting circuit 31) and taken by the wiring pattern inspecting system shown in FIG. 1. In FIG. 6, portions 301 of the image corresponding to portions of the printed wiring board in which only the base board 202 exists are light, portions 302 of the image corresponding to portions of the printed wiring board having the wiring pattern 3 is darker, and portions 303 of the image corresponding to portions of the printed wiring board in which two wiring patterns 3 are formed on the front and the back surface of the base board 202 are still darker. Portions of the wiring lines of the wiring patterns having chipped defects 211, 212, 213, 214 and 215 have a reduced thickness and x-ray images 311, 312, 313, 314 and 315 of those portions are lighter than the images of normal portions of the wiring lines of the wiring patterns.

Figure 9:
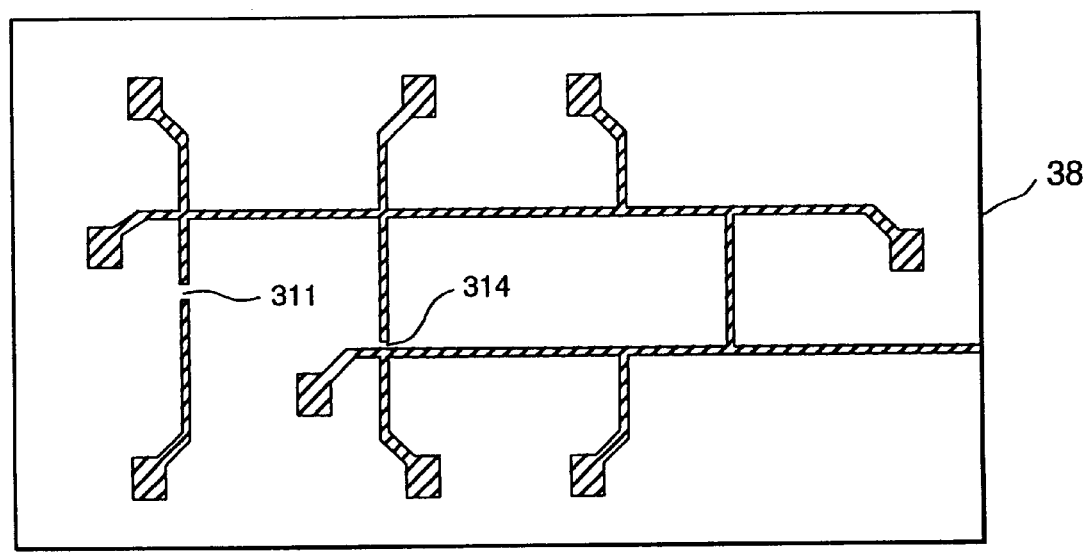
FIG. 9 is a binary image obtained by binarizing the x-ray transmission image of FIG. 6 by using a threshold Th1.
Figure 10:
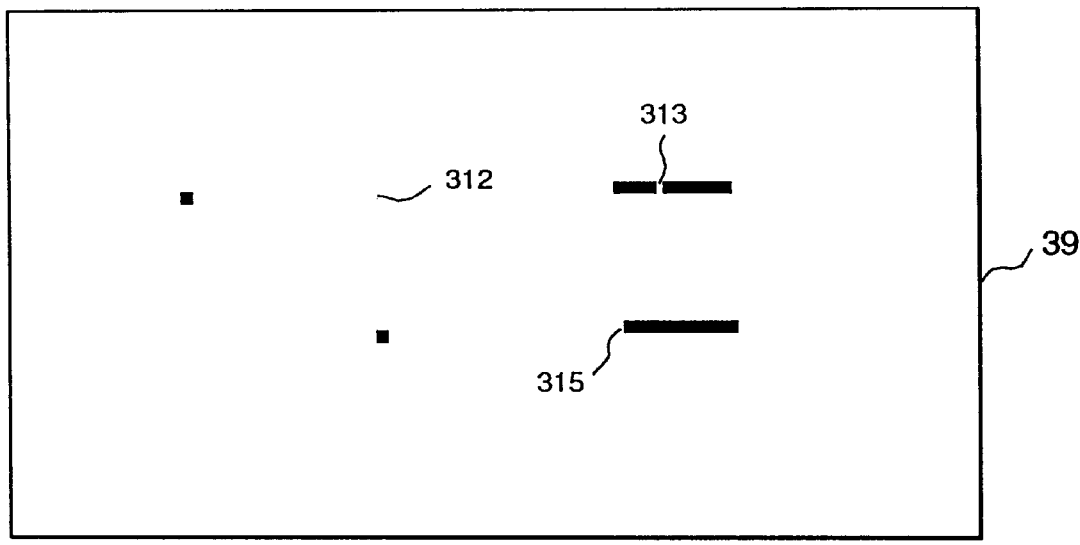
FIG. 10 is a binary image obtained by binarizing the x-ray transmission image of FIG. 6 by using a threshold Th2.

FIGS. 7 and 8 are waveform diagrams showing signals obtained by scanning the x-ray transmission image represented by the x-ray image signal 34 along a scanning line 304 and along a scanning line 305 in FIG. 6, respectively. Indicated at 3-101 and 3-201 are coordinate axes for density level, and at 3-102 and 3-202 are coordinate axes for scanning line. As is obvious from FIGS. 7 and 8, the image of a portion of the printed wiring board in which the wiring patterns 3 formed on the front and the back surface overlap each other, i.e., a portion corresponding to a double-layer wiring pattern, is darker than the image of a portion of the printed wiring board in which only one wiring pattern 3 is formed, i.e., a portion corresponding to a single-layer wiring pattern. A threshold Th1 corresponding to the density level of the image of a portion corresponding to a single-layer wiring pattern and a threshold Th2 corresponding to the density level of the image of a portion corresponding to the double-layer wiring patterns are shown in FIGS. 7 and 8. FIG. 9 shows a binary image as the wiring pattern more than superposed single layer represented by a binary image signal 38 obtained by binarizing the x-ray transmission image represented by the x-ray image signal 34 shown in FIG. 6 (digital image signal) by a binarizing circuit 37 included in the defect detecting and processing circuit 35 shown in FIG. 3 by using the threshold Th1 corresponding to the density level of the single-layer wiring pattern. FIG. 10 shows a binary image as the wiring pattern of superposed double layers represented by a binary image signal 39 obtained by binarizing the x-ray transmission image represented by the x-ray image signal 34 (digital image signal) by the binarizing circuit 37 included in the defect detecting and processing circuit 35 shown in FIG. 3 by using the threshold Th2 corresponding to the density level of the double-layer wiring patterns.

Figure 11:
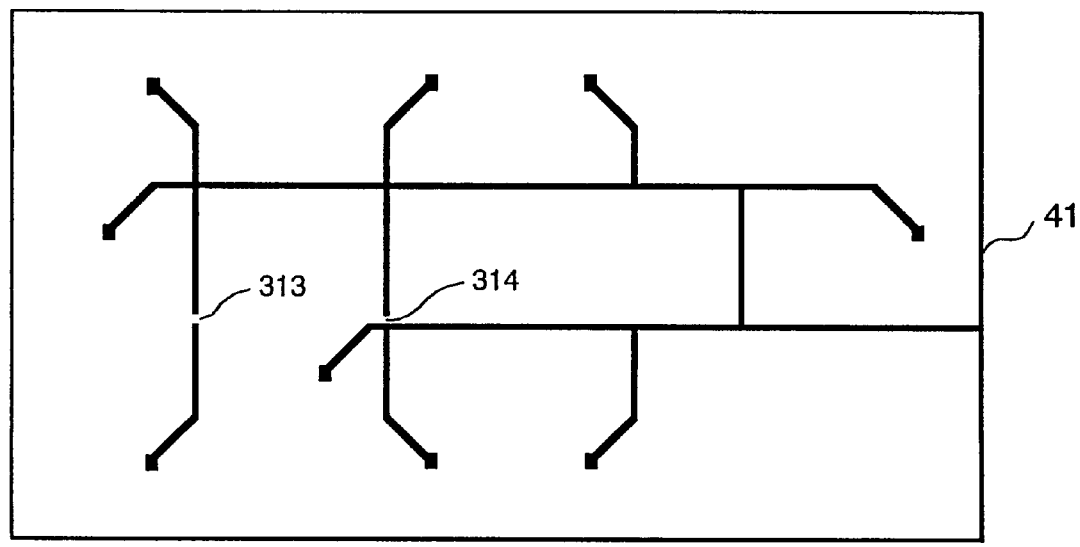
FIG. 11 is a skeletal image extracted from the binary image of FIG. 9.
Figures 12, 13:
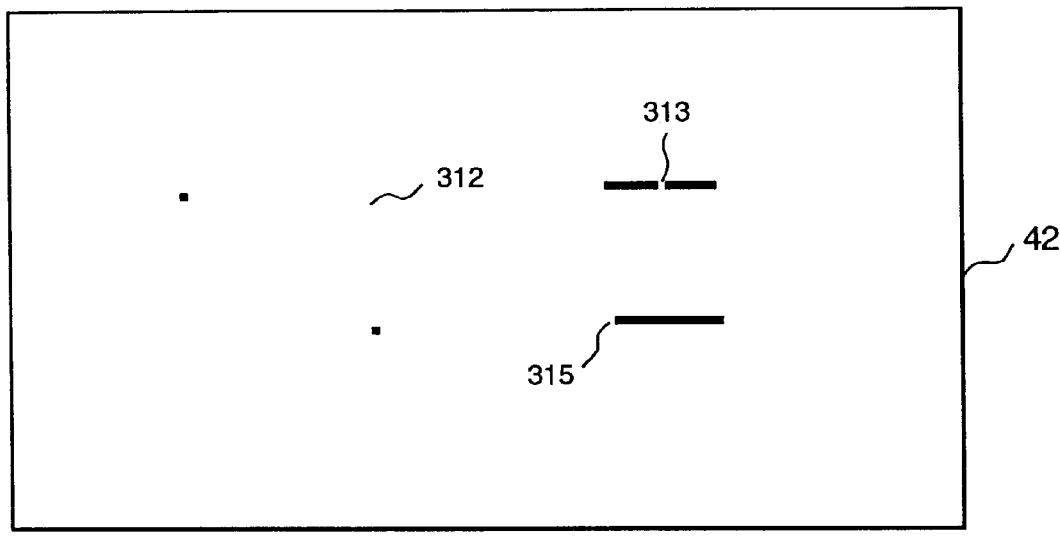
FIG. 12 is a skeletal image extracted from the binary image of FIG. 10.
FIG. 13 is a table showing hair nonremoving operators for a skeletal image extracting process.
Figures 14, 15:
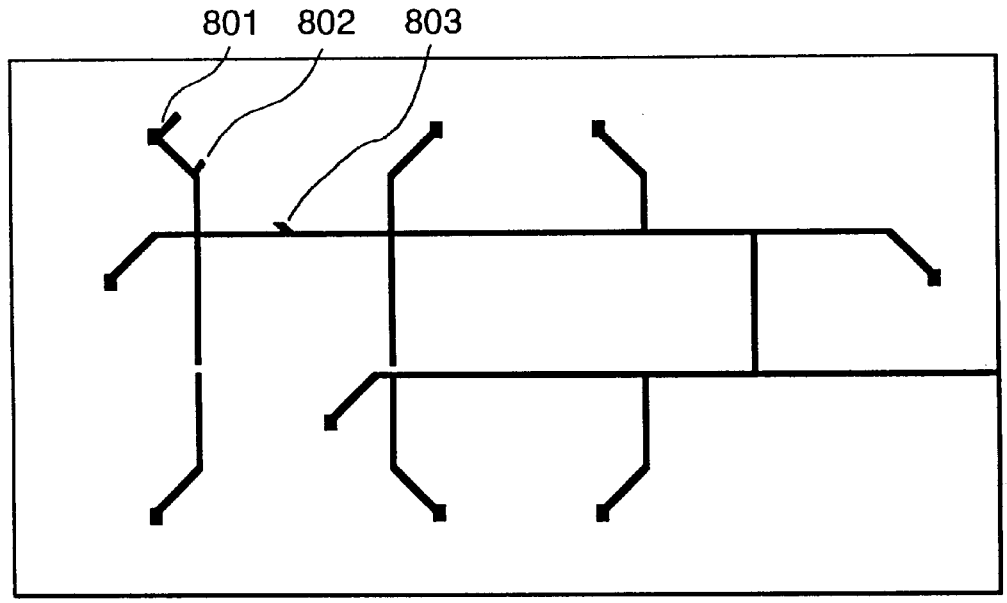
FIG. 14 is a diagrammatic view of skeletal lines obtained by a skeletal image extracting process and having hairs.
FIG. 15 is a table showing hair removing operators for a skeletal image extracting process.

The binary image shown in FIG. 9 represented by the binary image signal 38 is processed for a skeletal line extracting process by a skeletal image extracting circuit 40 included in the defect detecting and processing circuit 35 to obtain a skeletal image shown in FIG. 11. The lines shown in FIG. 11 are called skeletal lines 41 representing a wiring pattern more than superposed single layer. Similarly, the binary image shown in FIG. 10 represented by the binary image signal 39 is processed for a skeletal image extracting process by the skeletal image extracting circuit 40 of the defect detecting and processing circuit 35 to obtain an image shown in FIG. 12. The lines shown in FIG. 12 will be called skeletal lines 42 representing a wiring pattern of superposed double layers. The skeletal image extracting process reduces (thinnes) the thickness of lines forming an image of a wiring pattern to a thickness corresponding to the size of one pixel. More concretely, the skeletal image extracting process is repeated a number of times sufficient to extract skeletal lines by using sixteen types of 3×3 pixel operators as shown in FIG. 13 (only one of the sixteen operators is shown in FIG. 13). The skeletal image extracting process is described in JP-A No. 62-131391 or JP-A No. 1-230183 (corresponding to U.S. Pat. No. 5,301,248). In the binary image shown in FIG. 9 represented by the binary image signal 38 and the binary image shown in FIG. 10 represented by the binary image signal 39, a code 1 is assigned to hatched or black sections and a code 0 is assigned to white sections. Hairs being frequently produced by the skeletal image extracting process can be deleted by using desired operators being excepted an operators for shortening (deleting) end portions of an image of the wiring pattern, among sixteen types of 3×3 pixel operators as shown in FIG. 15 (only one of hair deleting 3×3 pixel operators is shown in FIG. 15). FIG. 14 shows skeletal lines with hairs 801, 802 and 803. Therefore, it is advantageous in view of processing efficiency to repeat the process using the operators shown in FIGS. 13 and 15 a necessary number of times dependent on the shape the image of the wiring patterns. The process using the operators shown in FIGS. 13 and 15 regards a continuity of wiring pattern for four pixels as a connection.

Figure 3:
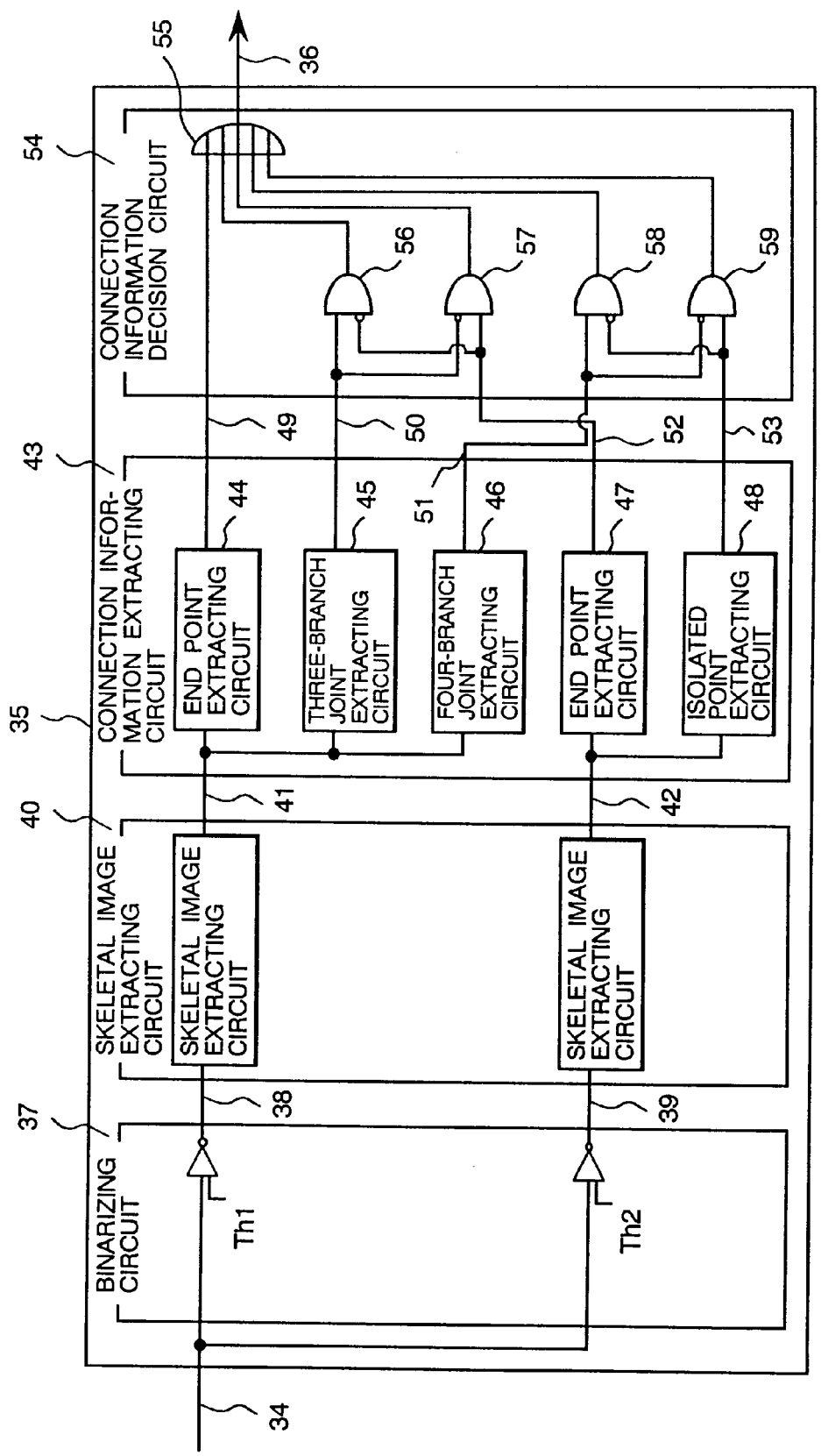
FIG. 3 is a circuit diagram of a defect detecting and processing circuit (defect detecting and processing means) included in the image processing unit of FIG. 2.
Figure 16:
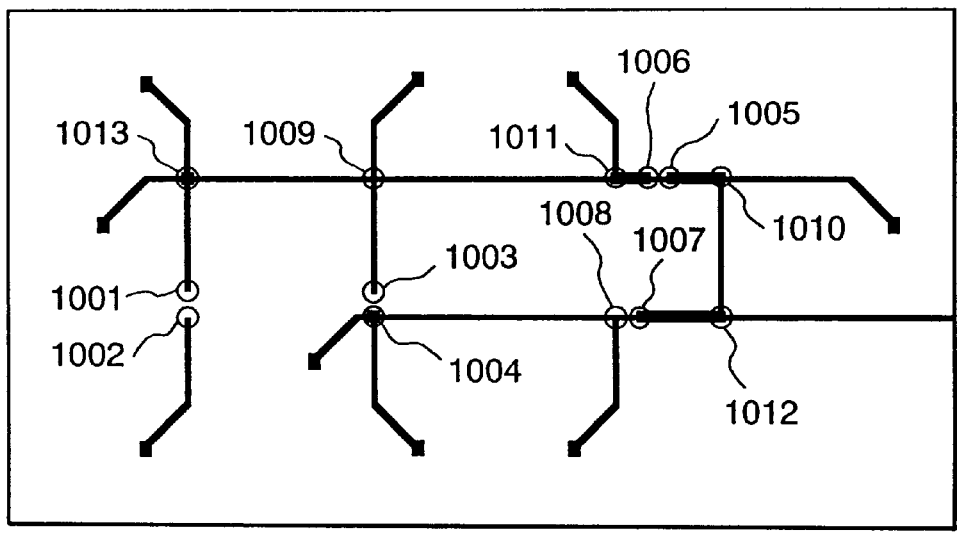
FIG. 16 is a diagrammatic view showing branching points in skeletal lines shown in FIGS. 11 and 12.

A connection information extracting circuit 43 shown in FIG. 3 extracts skeletal line connection information, i.e., the number of branches, from the skeletal lines 41 forming a portion of the image of a single-layer wiring pattern. For example, a pixel of a portion of a skeletal line where the skeletal line is bifurcated has a branch number of 3 and is called a three-branch joint. When this method of counting branch number is applied, a pixel on a single skeletal line has a branch number of 2, and a pixel at an end of a skeletal line has a branch number of 1, this pixel is called an isolated point. An isolated pixel has a branch number of 0 and this pixel is called an isolated point. An end point signal 49 provided by an end point extracting circuit 44, a three-branch joint signal 50 provided by a three-branch joint extracting circuit 45 and a four-branch joint signal 51 provided by a four-branch joint extracting circuit 46 on the skeletal lines 41 representing the single-layer wiring pattern shown in FIG. 11, and an end point signal 52 provided by an end point extracting circuit 47 and an isolated point signal 53 provided by an isolated point extracting circuit 48 on the skeletal lines 42 representing the double-layer wiring pattern shown in FIG. 12 are shown in FIG. 16, in which the branches are put on the skeletal lines representing the single-layer and the double-layer wiring pattern to facilitate understanding. Although this embodiment shows the branches in images, information about the branches may be positional information, such as coordinates, on the position of the branches to be processed by the next process.

A connection information extracting process (FIG. 16) to be carried out by the connection information extracting circuit 43 will be described below.

(1) Indicated at 1001, 1002 and 1003 are pixel signals 49 of "1" indicating end points on the skeletal lines 41 representing the single-layer wiring pattern.

(2) Indicated at 1004 is a pixel signal 50 of "1" indicating a three-branch joint on the skeletal line 41 representing the single-layer wiring pattern and a pixel signal 53 of "1" indicating an isolated point on the skeletal line 42 representing the double-layer wiring pattern.

(3) Indicated at 1005, 1006 and 1007 are pixel signals of "0" indicating two-branch joints on the skeletal lines 41 representing the single-layer wiring pattern and a pixel signal 52 of "1" indicating an end point on the skeletal line 42 representing the double-layer wiring pattern.

(4) Indicated at 1008 is a pixel signal 50 of "1" indicating a three-branch joint on the skeletal line 41 representing the single-layer wiring pattern.

(5) Indicated at 1009 is a pixel signal 51 of "1" indicating a four-branch joint on the skeletal line 41 representing the single-layer wiring pattern.

(6) Indicated at 1010 and 1011 are pixel signals 50 of "1" indicating three-branch joints on the skeletal lines 41 representing the single-layer wiring pattern and a pixel signal 52 of "1" indicating an end point on the skeletal line representing the double-layer wiring pattern.

(7) Indicated at 1013 is a pixel signal 51 of "1" indicating a four-branch joint on the skeletal line 41 representing the single-layer pattern and a pixel signal 53 of "1" indicating an isolated point on the skeletal line 42 representing the double-layer wiring pattern.

Incidentally, it is known from the examination of connection information about a normal wiring pattern that the skeletal lines 41 representing the single-layer wiring pattern have no end point because the wiring patterns to be inspected terminate in pads 207. Since the pixel signal 1013 indicates a point where respective wiring lines of the wiring pattern on the front surface of the base board and the wiring pattern on the back surface of the base board intersect each other, the pixel signal 1013 is the pixel signal 51 indicating a four-branch joint on the skeletal line 41 representing the single-layer wiring pattern and the pixel signal 53 indicating an isolated point on the skeletal line 42 representing the double-layer wiring pattern. The pixel signal 1010 indicates a bent in a wiring line of the wiring pattern formed on the front surface of the base board in a section in which the respective lines of the wiring pattern on the front surface and the wiring pattern on the back surface overlap each other, i.e., a portion of a change line, the pixel signal 1010 is the pixel signal 50 indicating a three-branch joint on the skeletal line 41 representing the single-layer wiring pattern and the pixel signal 52 indicating an end point on the skeletal line 42 representing the double-layer wiring pattern.

Accordingly, a connection information decision circuit 54 shown in FIG. 3 decides that a pixel corresponds to a defect when any one of the following five conditions is met.

Condition (1): An OR circuit 55 performs a logical OR operation between the pixel signals 49 of "1" indicating the end points 1001, 1002 and 1003 on the skeletal lines 41 representing the single-layer wiring pattern and a signal of "1" indicating a defect is provided; that is, pixels indicating end points on the skeletal lines representing the single-layer wiring pattern are regarded as defects.

Condition (2): An AND circuit 56 performs a logical AND operation between the pixel signal 50 of "1" indicating the three-branch joint on the skeletal line 41 representing the single-layer wiring pattern and a pixel signal of "1" obtained by inverting the pixel signal 53 of "0" not indicating the isolated point on the skeletal line 42 representing the double-layer wiring pattern, and a pixel signal of "1" indicating a defect is given to the OR circuit 55 and a signal "1" indicating a defect is provided; that is the pixel signal 1008 indicating a three-branch joint on the skeletal line 41 representing the single-layer wiring pattern and not indicating an end point on the skeletal line 42 representing the double-layer wiring pattern is regarded as a defect.

Condition (3): An AND circuit 58 performs a logical AND operation between the pixel signal 50 of "1" indicating the four-branch joint on the skeletal line 41 representing the single-layer wiring pattern and a pixel signal of "1" obtained by inverting the pixel signal 53 of "0" not indicating the isolated point on the skeletal line 42 representing the double-layer wiring pattern, a pixel signal of "1" indicating a defect is given to the OR circuit 55, and a signal of "1" indicating a defect is provided; that is, the pixel signal 1009 indicating a four-branch joint on the skeletal line 41 representing the single-layer wiring pattern and not indicating an isolated point on the skeletal line 42 representing the double-layer wiring pattern is regarded as a defect.

Condition (4): An AND circuit 57 performs a logical AND operation between the pixel signal 52 of "1" indicating the end point on the skeletal line 42 representing the double-layer wiring pattern and a pixel signal of "1" obtained by inverting the pixel signal 50 of "0" not indicating the three-branch joint on the skeletal line 41 representing the single-layer wiring pattern, a pixel signal of "1" indicating a defect is given to the OR circuit 55, and a signal of "1" indicating a defect is provided; that is the pixels 1005, 1006 and 1007 not corresponding to a three-branch joint on the skeletal line 41 representing the single-layer wiring pattern are regarded as defects.

Condition (5): An AND circuit 59 performs a logical AND operation between the pixel signal 53 of "1" indicating the isolated point on the skeletal line 42 representing the double-layer wiring pattern and a pixel signal of "1" obtained by inverting the pixel signal 53 of "0" not indicating the four-branch joint on the skeletal line 41 representing the single-layer wiring pattern, a pixel signal of "1" indicating a defect is given to the OR circuit 55, and a signal of "1" indicating a defect is provided; that is, the pixel 1007 corresponding to an isolated point on the skeletal line 42 representing the double-layer wiring pattern and not indicating a four-branch joint on the skeletal line 41 representing the single-layer wiring pattern is regarded as a defect.

Although the defect detecting and processing unit 35 shown in FIG. 3 has been described as a unit that provides a signal indicating defect or not defect, the defect detecting and processing unit 35 may provide coordinate data indicating the positions of defects.

In FIG. 16, 1001, 1002 and 1003 meet Condition (1), 1008 meets Condition (2), 1009 meets Condition (3), 1005, 1006 and 1007 meet Condition (4) and 1004 meets condition (5). Therefore, the defects 211, 212, 213, 214 and 215 shown in FIG. 5 can be detected. A correct decision is made such that points 1010, 1011, 1012 and 1013 shown in FIG. 16 are joints on normal wiring patterns and are not defects.

A second embodiment of the present invention will be described hereinafter.

Figure 17:
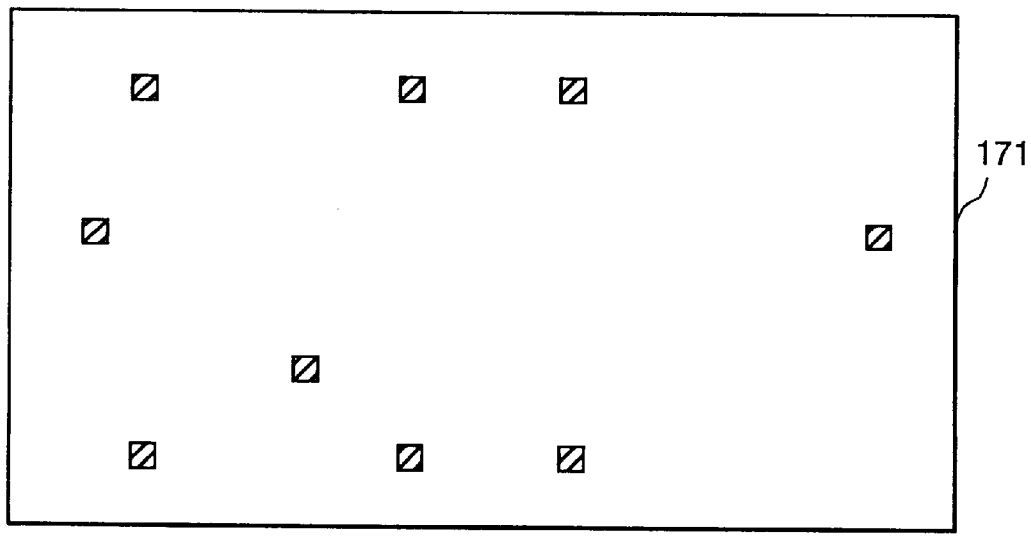
FIG. 17 is a diagrammatic view of an image obtained by subjecting the image shown in FIG. 9 to a degeneration process.
Figures 18, 19:
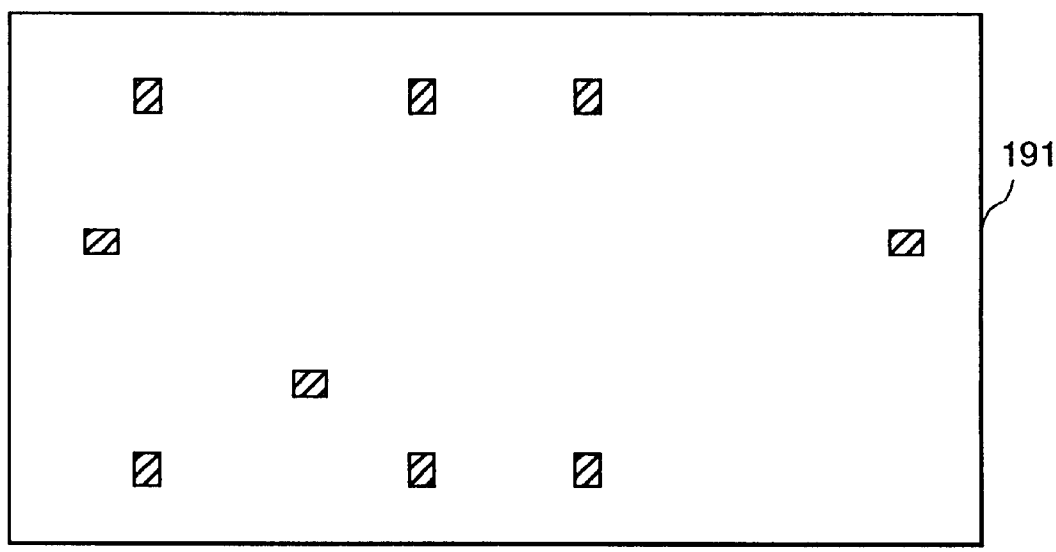
FIG. 18 is a table showing operators for a degeneration process.
FIG. 19 is a diagrammatic view of an image obtained by subjecting the image shown in FIG. 17 to an expansion process.

In the first embodiment, there is the possibility that a projection, such as the hair 801 shown in FIG. 14, is extracted when extracting skeletal lines because the width of the pads 270 is greater than that of the wiring lines of the wiring patterns 3 as shown in FIG. 5. For example, in the first embodiment, it is decided that the hair 801 is a defect if the end point of the hair 801 is regarded as an end point of the wiring pattern. The following process is carried out to prevent such a decision. The binary image 38 obtained by binarization using the threshold Th1 for the single-layer wiring pattern is subjected to a reduction process to obtain a reduced image 171 as shown in FIG. 17. The reduction process is repeated a necessary number of times using operators like the one shown in FIG. 18. The necessary number of times is dependent on the width of the wiring lines of the wiring pattern. Then, the reduced image shown in FIG. 17 is subjected to an expansion process using operators like the one shown in FIG. 20 to obtain an expanded image 191 as shown in FIG. 19. The joints extracted from the skeletal lines shown in FIG. 16 is masked by the expanded image 191 shown in FIG. 19, so that the hair 801 shown in FIG. 14 is not regarded as a branch in the wiring pattern and it is not decided that the hair 801 is a defect.

A third embodiment of the present invention will be described hereinafter.

The first embodiment has been described as applied to inspecting a two-layer printed wiring board provided with two wiring patterns formed on the front and the back surface of a base board. The third embodiment will be described as applied to inspecting a printed wiring board provided with n layers (n is equal to three or above) of wiring patterns. An x-ray image of the printed wiring board is separated into images representing a one-layer wiring pattern (a single-layer wiring pattern), superposed two-layer wiring patterns, . . . and superposed n-layer wiring patterns, respectively, by using n thresholds by a method similar to that using two thresholds Th1, Th2 employed in the first embodiment, skeletal line images are extracted from the images and skeletal line images representing each of the one-layer wiring pattern, . . . and the superposed n-layer wiring patterns are obtained. The skeletal line image corresponding to a superposed s-layer wiring patterns includes the skeletal line images representing the wiring patterns superposed as layers greater than s-layers. For example, the skeletal line image representing the single-layer wiring pattern shown in FIG. 11 includes the skeletal line image representing the superposed double-layer wiring patterns shown in FIG. 12. The skeletal line images are separated again into those representing the wiring pattern layers for the sake of explanation. Skeletal line image representing only the s-layer wiring patterns superposed by only s-layers obtained by removing skeletal line images of wiring patterns superposed by layers being more than s-layers will be called a regular skeletal line image representing only the superposed s-layer wiring patterns. The number of joints in the thus extracted skeletal line image are examined. A maximum number of joints is 2n. The following condition (1) or (2) is satisfied when an aimed pixel on the skeletal lines representing the single-layer wiring pattern (skeletal lines representing one or more layer) is a b-branch joint; that is, the following condition (1) or (2) is satisfied when the wiring patterns are normal (have no defect).

Condition (1): When the aimed pixel is an isolated point on the skeletal line representing Im-layer wiring pattern, b pixels adjacent to the aimed pixel are end points on the regular I1-layer to the regular Ib-layer wiring pattern, and the 2Im-layer wiring pattern is the largest among the I1-layer to Ib-layer wiring pattern, which is expressed by:

$$\Sigma Ik = 2Im \tag{3}$$

where $1 \leq k \leq b$.

Figure 22A:
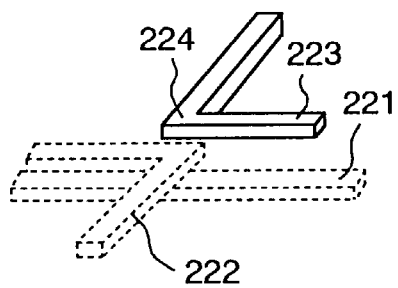
FIGS. 22(a) and 22(b) are views for assistance in explaining conditions for carrying out a third embodiment of the present invention when an aimed pixel coincides with an isolated point on skeletal lines of three layered wiring patterns.
Figure 22B:
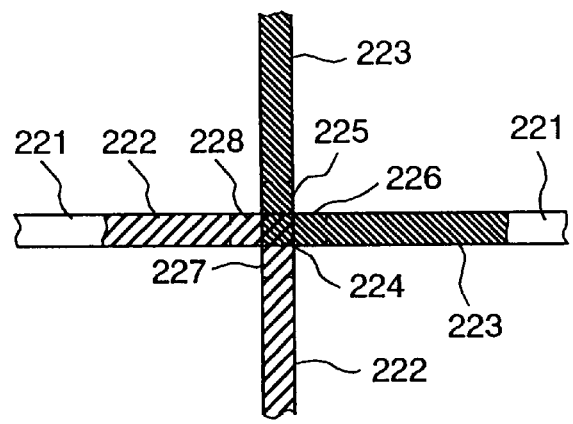

FIG. 22 shows an aimed pixel 224 at an isolated point on skeletal line representing I3-layer wiring pattern. In FIG. 22(*a*), a skeletal line 221 is shown as a first layer wiring pattern, a skeletal line 222 is shown as a second layer wiring pattern, a skeletal line 223 is shown as a thrid layer wiring pattern. Therefore, the aimed pixel 224 represents a three-layer isolated point. End points on the regular I1-layer, the regular I2-layer, the regular I1-layer and the regular I2-layer wiring pattern, respectively, are indicated by b (four) pixels 225, 226, 227 and 228, respectively. Therefore, $\Sigma$ Ik=I1+I2+I1+I2=I6=2×I3.

Condition (2): When the aimed pixel is an end point on the skeletal lines representing Im-layer wiring pattern, (b−1) pixels adjacent to the aimed pixel are end points on the regular I1-layer to the regular I(b−1)-layer wiring pattern, and the Im-layer wiring pattern is the largest among the I1-layer to I(b−1)-layer wiring pattern, which is expressed by:

$$\Sigma Ik = Im \tag{4}$$

where $1 \leq k \leq b-1$.

Figure 23A:
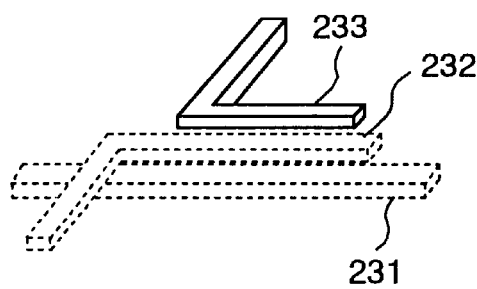
FIGS. 23(a) and 23(b) are views for assistance in explaining conditions for carrying out a third embodiment of the present invention when an aimed pixel coincides with an end point on skeletal lines of three layered wiring patterns having no chipped defect.
Figure 23B:
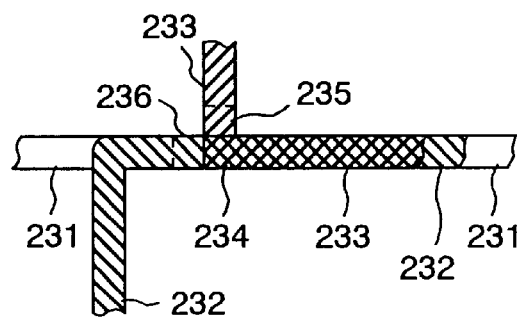

FIG. 23 shows an aimed pixel 234 at an end point on skeletal lines representing I3-layer wiring pattern. In FIG. 23(*a*), a skeletal line 231 is shown as a first layer wiring pattern, a skeletal line 232 is shown as a second layer wiring pattern, a skeletal line 233 is shown as a third layer wiring pattern. Therefore, the aimed pixel 234 represents a three-layer end point. End points on the regular I1-layer and the regular I2-layer wiring pattern, respectively, are indicated by (b−1) (two) pixels 235 and 236, respectively. Therefore, $\Sigma$ Ik=I1+I2=I3.

The third embodiment, similarly to the first embodiment, regards those that do not meet Conditions (1) and (2) as chipped defects.

A pattern of an optional number of layers (including patterns of numbers of layers greater than the optional number) can be obtained by binarizing the x-ray image by using an appropriate threshold. Suppose that a latticelike pattern is formed. Then, a region including an intersection point meets the following criterion.

Criterion: Portions not meeting an expression:

$$\Sigma f(x) = 2n \tag{5}$$

where $a \leq x \leq n$, n is a maximum superposed number of wiring patterns existing in the region, and f(x) is the joint number (the branch number) on x-layer wiring patterns (superposed number of x).

Grounds for the criterion will be explained.

I) When n=1, f(1)=2 (only a single-layer wiring pattern exists in the region as shown in FIG. 24(*a*)) and Expression (6) is met.

II) Suppose that the criterion expressed by Expression (6) is met when n=k $$\Sigma fk(x) = 2k \tag{6}$$

where $1 \leq x \leq k$.

Examination is made to see if Expression (7) is met when n=k+1.

$$\Sigma fk+1(x) = 2(k+1) \tag{7}$$

where $1 \leq x \leq k+1$.

The notation fk is used for discriminating between the shapes of patterns because the shape f(x) of a pattern is not necessarily the same as the shape f(x) of another pattern.

The (k+1)th pattern overlaps k patterns in one of three states (8), (ii) and (iii).

(i) One end of the (k+1)th pattern overlaps a layers and the other end of the same overlaps b layers (a<b≤k). (FIG. 24(*b*))

(ii) One end of the (k+1)th pattern overlap a layers and the other end of the same does not overlap any of the patterns (a≤k). (FIG. 24(*c*))

(iii) The (k+1)th pattern does not overlap any of the patterns. (FIG. 24(*d*))

In the state (i), fk+1(a+1)=fk(a+1)+1, fk+1(b+1)=fk(b+1)+1, fk+1(k+1)=0.

When x≠a and x≠b, fk+1(x)=fk(x).

Therefore, $$\Sigma fk+1(x) = \Sigma fk(x) = 2(k+1) \tag{8}$$

where $1 \leq x \leq k+1$ and $1 \leq x \leq k$, and Expressions (6) and (7) are satisfied.

In the state (ii), fk+1(1)=fk(1)+1, fk+1(a+1)=fk(a+1)+1 and fk+1(k+1)=0.

When x≠a and x≠b, fk+1(x)=fk(x).

Therefore, Expressions (6) and (7) are satisfied.

In the state (iii), fk+1(1)=fk(1)+2 and fk+1(k+1)=0. When x≠a and x≠b, fk+1(x)=fk(x).

Therefore, Expressions (6) and (7) are satisfied.

A fourth embodiment of the present invention will be described hereinafter.

In some cases it is necessary to specify layers having defects in a plurality of layers of wiring patterns of a printed wiring board for correcting work on the job site after inspection, and the management of manufacturing processes. On such an occasion, layers having defects are specified from the features in the shape and the direction of extension of wiring patterns having defects detected by the method in the first and the second embodiment. For example, suppose that, in a two-layer printed wiring board provided with two wiring patterns on the front and the back surface of the base board thereof, all the wiring lines of the wiring pattern formed on the front surface of the base board extend in the direction of extension of the longer sides of the base board, i.e., a y-direction, and all the wiring lines of the wiring pattern formed on the back surface of the base board extend in the direction of extension of the shorter sides of the base board, i.e., an x-direction. Then, defects are in the wiring pattern formed on the front surface of the base board when those defects are on the wiring lines extending in the y-direction. The use of information about the shapes of wiring patterns in addition to connection information about skeletal lines for detecting defects and adding the results of detection to defect data is useful for correcting work after inspection on the job site and management of the manufacturing processes.

A fifth embodiment of the present invention will be described hereinafter.

Figures 20, 21:
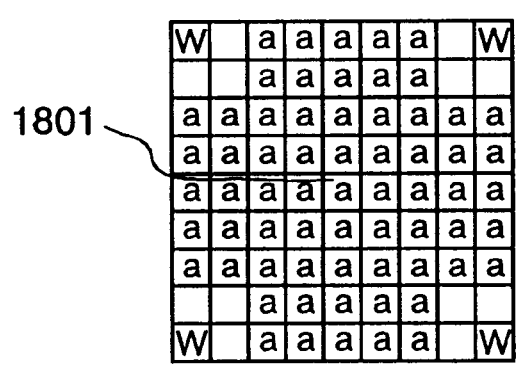
FIG. 20 is a table showing operators for an expansion process.
FIG. 21 is a diagrammatic view showing operators for feature extraction.

The first embodiment processes the x-ray image of a printed wiring board to extract skeletal lines representing the wiring patterns of the printed wiring board. The fifth embodiment detects defects without extracting skeletal lines. Feature extraction operators, i.e., small regions, are cut out from the binary images 38 and 39 shown in FIGS. 9 and 10, and connection conditions are determined by determining the arrangement of pixels in the regions. FIG. 21 shows a feature extraction operator by way of example. In the feature extraction operator shown in FIG. 21, a decision is made as to whether or not an aimed pixel 1801, i.e., a center pixel, is a joint in the image of the wiring pattern to extract all types of joints. The feature extraction operator shown in FIG. 21 is used for extracting four-branch joints and consists of 9×9 pixels. When all the 117 pixels a are 1 and all the four pixels w are 0, it is decided that the aimed pixel represents a four-branch joint. Similarly, feature extraction operators for all types of joints are used to extract all types of joints. An image including a number of branches as shown in FIG. 16 can be obtained by this methods and the image is processed by a process similar to that employed in the first embodiment to detect defects. Since the fifth embodiment does not need to extract any skeletal lines from the image, the image processing unit may be of a small scale.

A sixth embodiment of the present invention will be described hereinafter.

Figure 25:
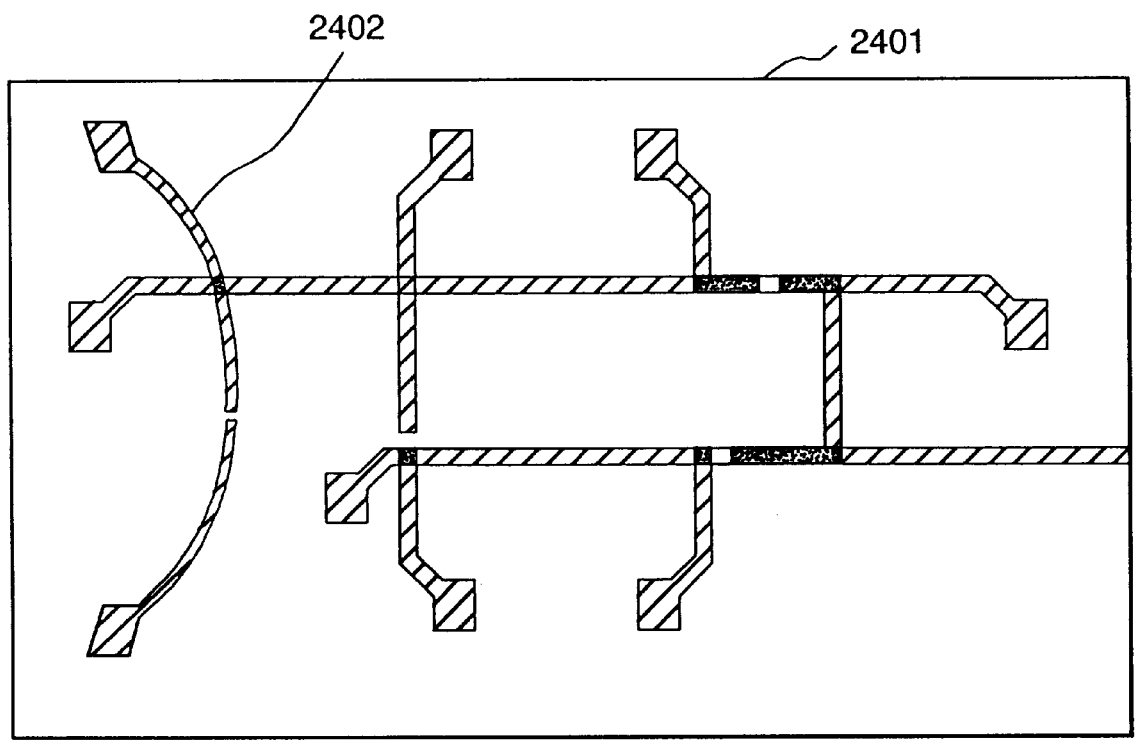
FIG. 25 is a view of an x-ray transmission image of the printed wiring board shown in FIG. 5 obtained by a sixth embodiment of the present invention, in which the image is not smooth and lines forming the image are curved.
Figure 26:
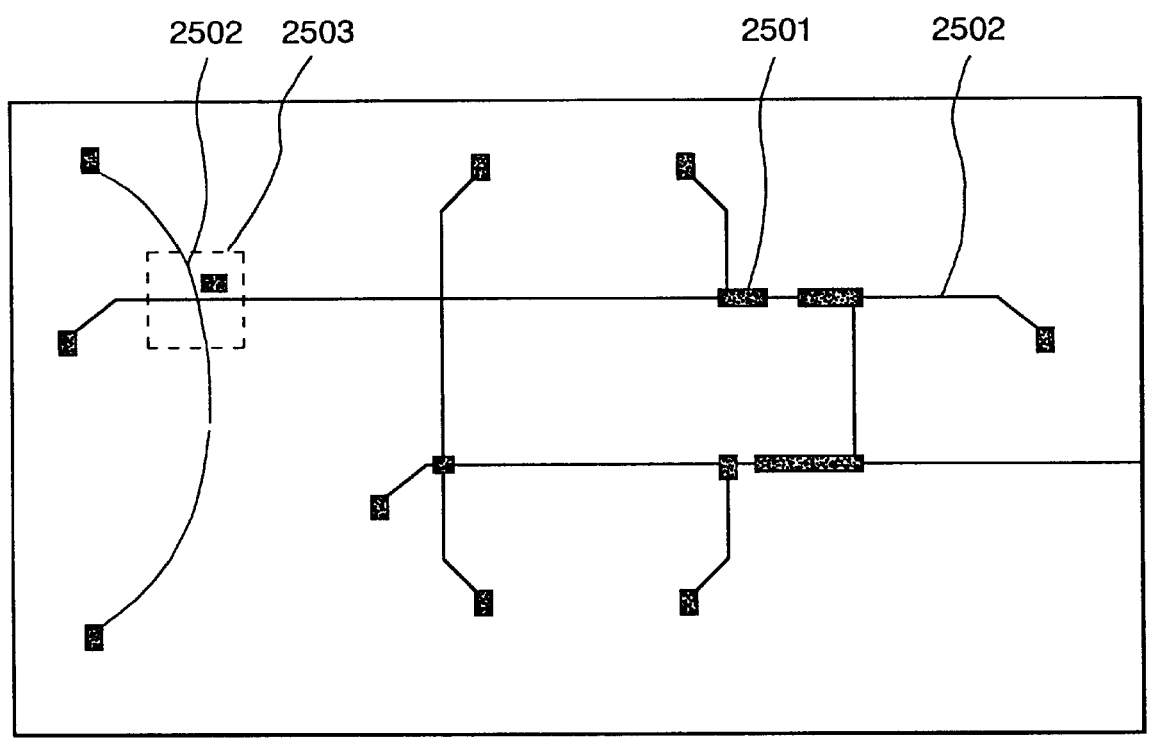
FIG. 26 is a view of a skeletal image extracted by binarizing the x-ray transmission image of FIG. 25 by using thresholds Th1 and Th2.

The first embodiment extracts joints as shown in FIG. 16 from the skeletal lines representing the wiring patterns. In some cases, the pincushion distortion of an image of the wiring patterns taken by the x-ray inspection unit occurs due to the characteristics of the x-ray inspection unit, an irregular image of the wiring patterns is formed or lines representing the wiring lines are curved or deformed due to curved wiring lines of the wiring patterns or noise generated by the x-ray inspection unit, and the skeletal lines representing the wiring patterns are deformed due to the characteristics of the skeletal image extracting process. When such troubles occur, the x-ray image signal 36 shown in FIG. 6 obtained by the first embodiment is distorted in an x-ray image 2401 shown in FIG. 25, in which an image line representing a wiring line is curved in the shape of a curved image line 2402. FIG. 26 shows a skeletal image obtained by subjecting the x-ray image 2401 to skeletal image extracting process by the skeletal image extracting circuit 40 previously described in connection with the first embodiment. The skeletal image shown in FIG. 26 includes skeletal lines 2502 representing a single-layer wiring pattern and skeletal lines 2501 representing a double-layer wiring pattern in a superposed state.

Figure 27:
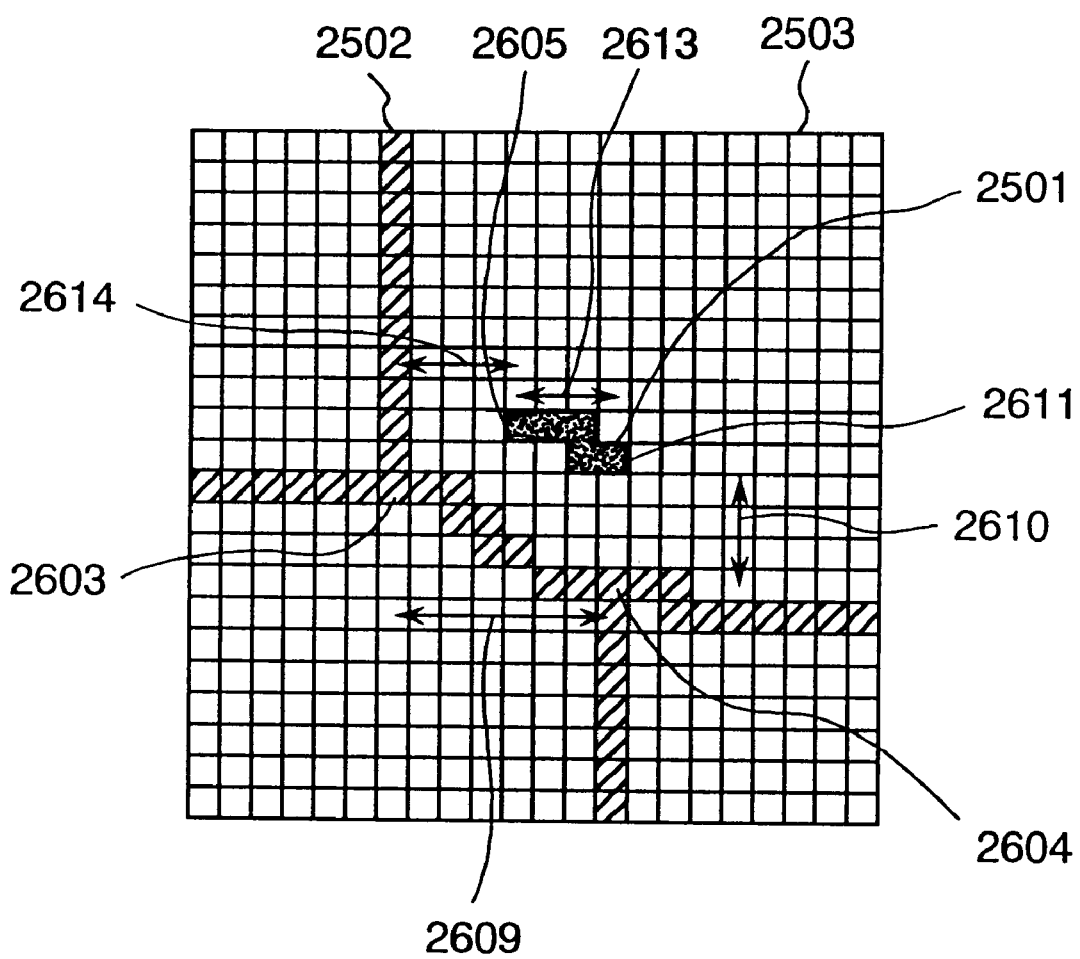
FIG. 27 is an enlarged diagrammatic view corresponding to part of FIG. 26.

FIG. 27 is an enlarged view of a portion 2503 of FIG. 26. In FIG. 27, joints 2603 and 2604 are superposed on the skeletal line 2502 representing the single-layer wiring pattern and the skeletal line 2501 representing the double-layer wiring pattern, respectively, to facilitate understanding. A pixel 2603 of "1" represents a three-branch joint on the skeletal line 2502 of the single-layer wiring pattern, a pixel 2604 represents a three-branch joint of "1" on the skeletal line 2502 of the single-layer wiring pattern, a pixel 2605 of "1" represents an isolated point on the skeletal line 2501 of the double-layer wiring pattern, and a pixel 2611 represents an isolated point of "1" on the skeletal line 2501 of the double-layer wiring pattern. In FIG. 27, the distance 2609 between the pixels 2604 and 2603 corresponds to seven pixels, the distance 2610 between the pixels 2604 and 2611 corresponds to four pixels, the distance 2613 between the pixels 2605 and 2611 corresponds to three pixels, and the distance 2614 between the pixels 2605 and 2603 corresponds to four pixels. Although these wiring patterns are not defective, the connection information decision circuit 54 employed in the first embodiment decides that the wiring patterns are defective.

Figure 28:
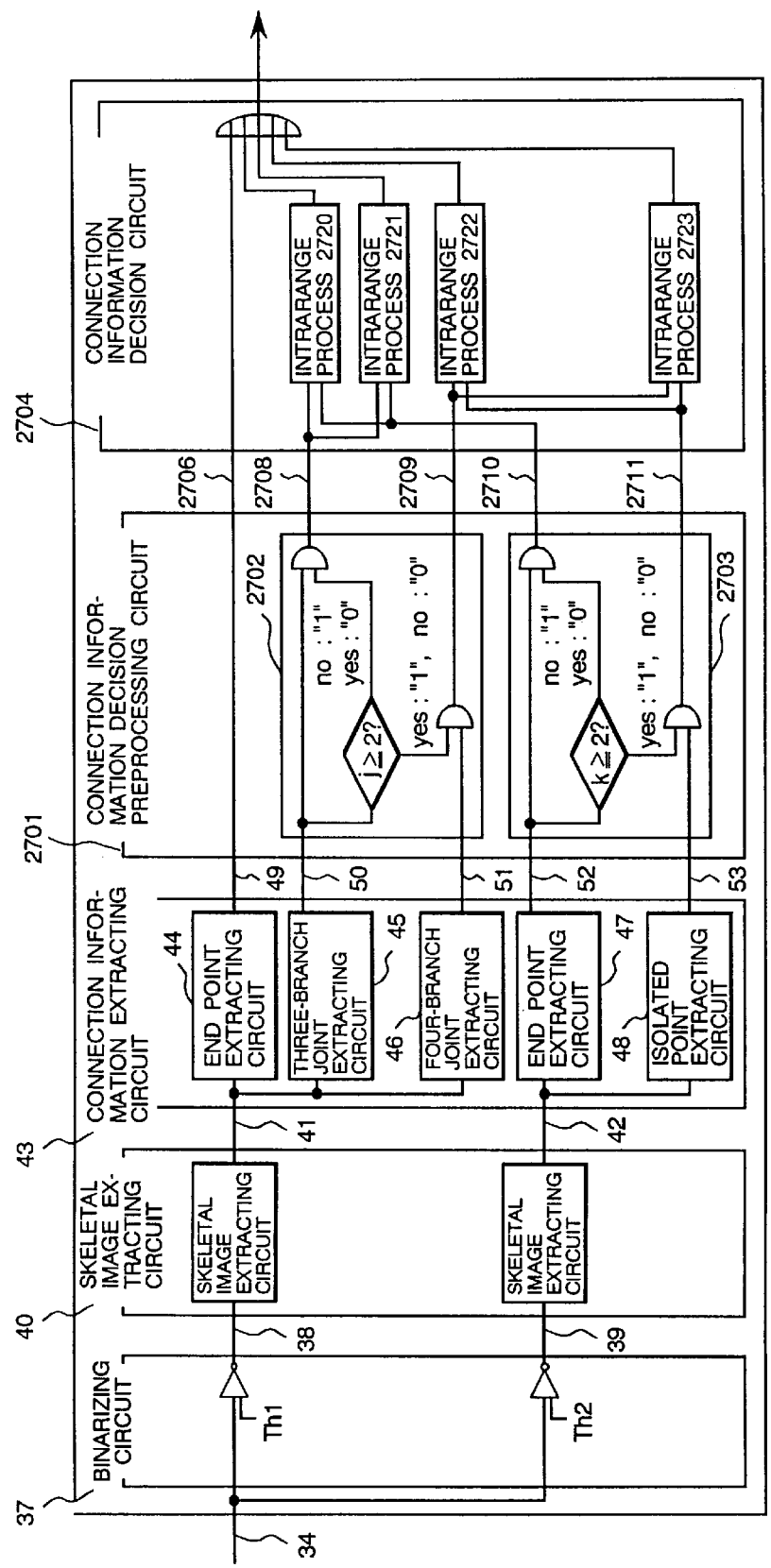
FIG. 28 is a circuit diagram of a defect detecting and processing circuit (defect detecting and processing means) included in the wiring pattern inspecting system of FIG. 2, developed by incorporating processes for processing the image of the wiring pattern shown in FIG. 25 into the defect detecting and processing circuit (defect detecting and processing means) shown in FIG. 3.

The sixth embodiment employs a connection information decision preprocessing circuit 2701 connected to the output of the connection information extracting circuit 43 as shown in FIG. 28. The connection information decision preprocessing circuit 2701 carries out processes 2702 and 2703.

Process 2702:

When there are two or more pixels including the pixel represented by the pixel signal 50 of "1" reresenting the three-branch joint on the skeletal line 2502 of the single-layer wiring pattern within ten pixels from the pixel represented by the pixel signal 50, i.e., in $21^2=441$ pixels around the pixel represented by the pixel signal 50 (in FIG. 27, the distance between the three-branch joints 2603 and 2604 corresponds to seven pixels (less than ten pixels)), the pixel signal provides "1" as a pixel signal 2709 representing a four-branch joint and gives "0" to a pixel signal 2708 representing a three-branch joint.

Process 2703:

When there are two or more pixels including the pixel represented by the pixel signal 52 of "1" representing the end point on the skeletal line 2501 of the double-layer wiring pattern within ten pixels from the pixel represented by the pixel signal 52, i.e., in $21^2=441$ pixels around the pixel represented by the pixel signal 52 (in FIG. 27, the distance between the end points 2605 and 2611 corresponds to three pixels (less than ten pixels)), the pixel provides "1" as a pixel signal 2711 representing an isolated point and gives "0" to a pixel signal 2710 representing an end point.

A connection information decision circuit 2704 is employed instead of the connection information decision circuit 54. When making a decision, the connection information decision circuit 2704 permits a dislocation within ten pixels from the pixel, i.e., in a region of $21^2=441$ pixels around the pixel. That is, processes 2720, 2722, 2721 and 2723 are used instead of Conditions (2), (3), (4) and (5) for the connection information decision circuit 54 employed in the first embodiment, respectively.

Process 2720:

Pixel signals within ten pixels from a pixel signal 2710 of "1" representing the end point on the skeletal line of the double-layer wiring pattern, i.e., in the range of $21^2=441$ pixels around the pixel, are set to "1", and a logical AND operation is performed between a pixel signal of "1" obtained by inverting a pixel signal of "0", and a pixel signal 2708 of "1" representing the three-branch joint on the skeletal line of the single-layer wiring pattern.

Process 2721:

Pixel signals within ten pixels from the pixel signal 2708 of "1" representing the three-branch joint on the skeletal line of the single-layer wiring pattern, i.e., in the range of $21^2=441$ pixels around the pixel, are set to "1", and a logical AND operation is performed between a pixel signal of "1" obtained by inverting a pixel signal of "0", and the pixel signal 2710 of "1" representing the end point on the skeletal line of the double-layer wiring pattern.

Process 2722:

Pixel signals within ten pixels from the pixel signal 2711 of "1" representing the isolated point on the skeletal line of the double-layer wiring pattern, i.e., in the range of $21^2=441$ pixels around the pixel, are set to "1", and a logical AND operation is performed between a pixel signal of "1" obtained by inverting a pixel signal of "0", and the pixel signal 2709 of "1" representing the four-branch joint on the skeletal line of the single-layer wiring pattern.

Process 2723:

Pixel signals within ten pixels from the pixel signal 2709 of "1" representing the four-branch joint on the skeletal line of the single-layer wiring pattern, i.e., in the range of $21^2=441$ pixels around the pixel, are set to "1", and a logical AND operation is performed between a pixel signal of "1" obtained by inverting a pixel signal of "0", and the pixel signal 2711 of "1" representing the isolated point on the skeletal line of the double-layer wiring pattern.

The branch joints shown in FIG. 27 are decided to be not defective and 211, 212, 213, 214 and 215 shown in FIG. 5 are decided, as described in connection with the first embodiment, to be defects by those processes. Although the sixth embodiment uses ten pixels as a measure to define the range of dislocation from the aimed pixel, the number of pixels to define the range of dislocation may be determined according to the quality of the x-ray image.

A seventh embodiment of the present invention will be described hereinafter.

Figure 29:
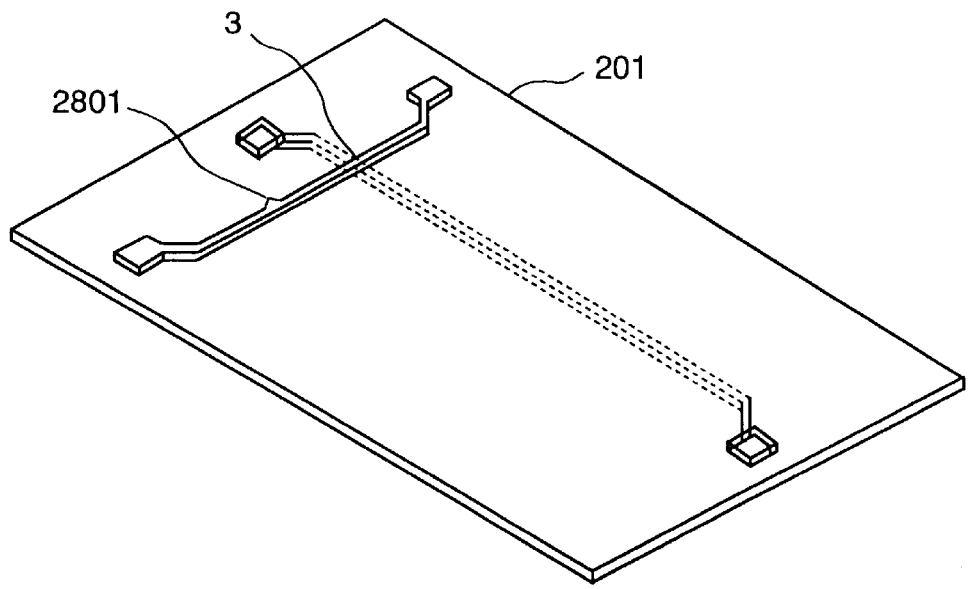
FIG. 29 is a perspective view of a multilayer printed wiring board to be inspected by the present invention.
Figure 30:
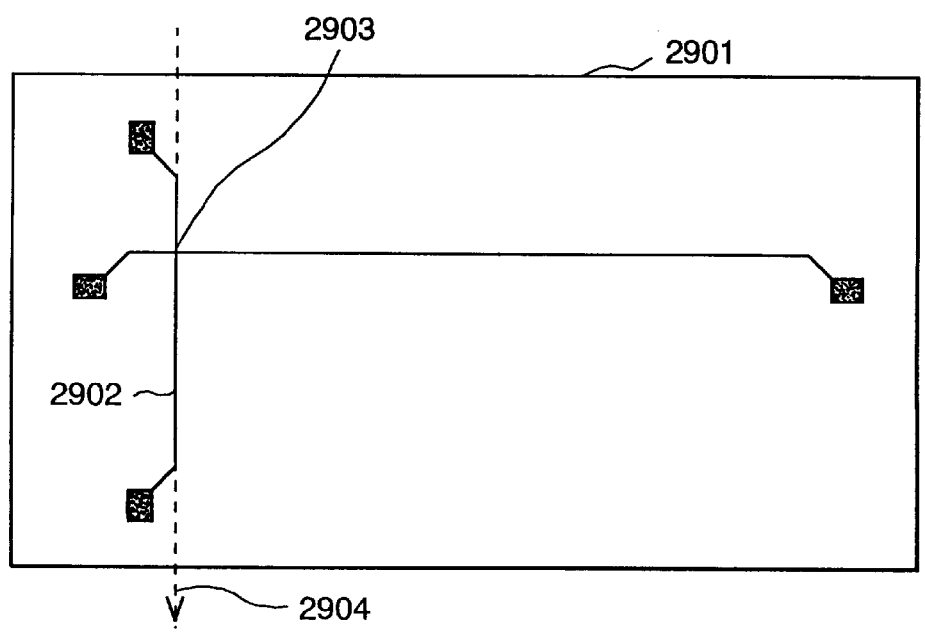
FIG. 30 is an x-ray transmission image of the multilayer printed wiring board of FIG. 29.
Figure 31:
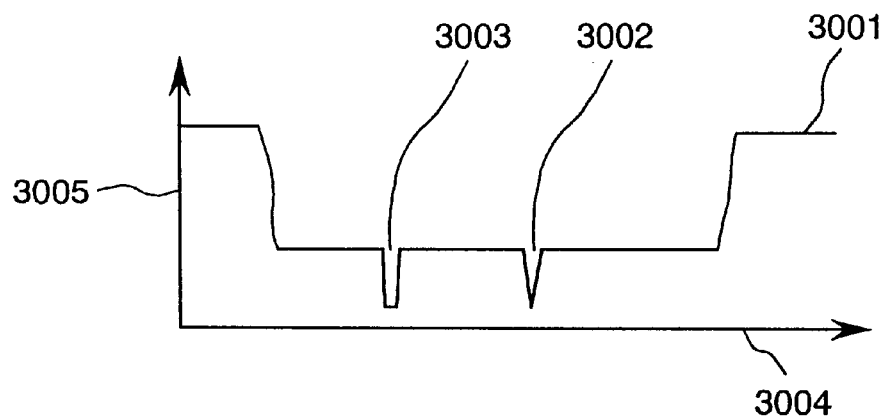
FIG. 31 is a diagram showing the waveform of a signal obtained by scanning the x-ray transmission image of FIG. 30.

Although the wiring pattern inspecting methods in the first to the sixth embodiment have been described as applied to inspecting wiring patterns for defects including tunnellike internal defects 41 and chipped surface defects 42 as shown in FIG. 4, nodular defects can be formed due to excessive deposition of a material in forming the wiring patterns. FIG. 29 shows a printed wiring board provided with wiring patterns 3 having a nodular defect 2801, FIG. 30 shows an x-ray image 2901 of the printed wiring board of FIG. 29, and FIG. 31 shows a signal 3001 obtained by scanning the x-ray image 2901 along a scanning line 2904. In FIG. 31, indicated at 3002 is a signal corresponding to an x-ray image of the nodular defect 2801 and at 3003 is a signal corresponding to an x-ray image 2903 of a double-layer portion of the wiring patterns 3. When the x-ray image 2901 is processed by the first embodiment for binarization, skeletal line extraction and connection information decision, the x-ray image of the nodular defect 2801 is extracted as a skeletal line representing a double-layer wiring pattern, which is decided to be a defect by the connection information decision circuit 55. Thus, the nodular defect can be detected.

An eighth embodiment of the present invention will be described hereinafter.

The first embodiment decides connection information about the single-layer pattern and the double-layer pattern to detects defects in superposed portions of the wiring patterns. A wiring pattern inspecting method in the eighth embodiment does not detect defects in superposed portions of the wiring patterns, but simplifies image processing and reduces the probability of misidentifying normal parts as defects.

The skeletal image consisting of the skeletal lines 41 is obtained by extracting the skeletal lines 41 from the binary image 38 shown in FIG. 9 obtained by binarizing the digital image by using the threshold for a single-layer wiring pattern by the skeletal image extracting circuit 40, end points are extracted from the skeletal image by the end point extracting circuit 44 included in the connection information extracting circuit 43, and a defect detection signal 36 representing information about the extracted end points is provided. A wiring pattern inspecting system is operated in such an inspection mode, i.e., a simple inspection mode, when circumstances permits.

A ninth embodiment of the present invention will be described hereinafter.

Figure 32:
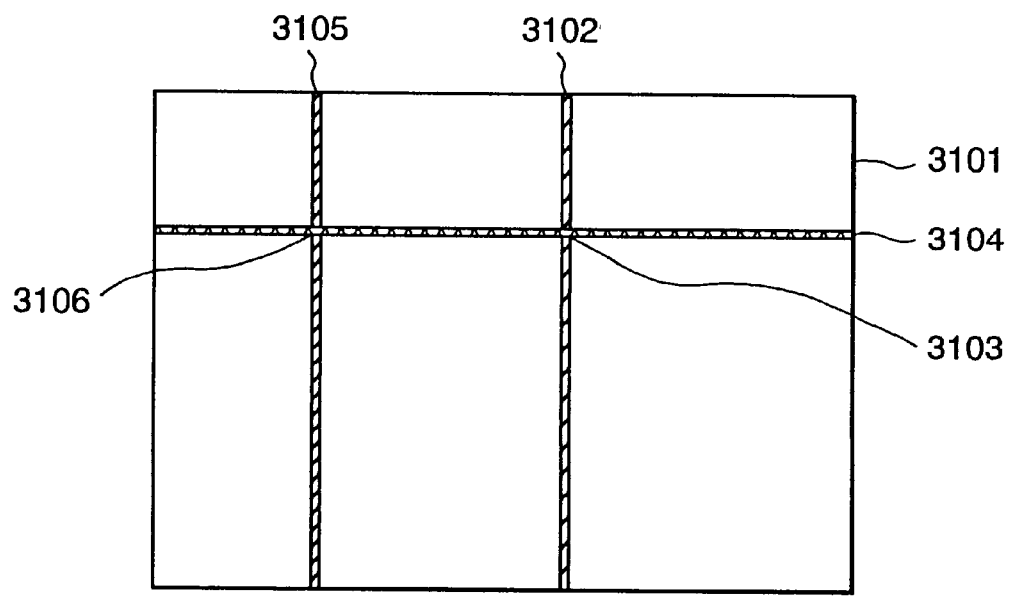
FIG. 32 is a diagrammatic view of a road map information in accordance with the present invention.

Although the wiring pattern inspecting methods in the first to the eighth embodiment have been described as applied to inspecting wiring patterns for defects, the ninth embodiment is an application of the present invention to a method of processing road map information. Referring to FIG. 32, suppose that a high-level road 3105 and a second road are constructed additionally across an existing first road 3104 shown on a map 3101. Information on the new roads 3105 and 3102 including parameters indicating the type of the new roads 3105 and 3102, i.e., a high-level road, a ground road and an underground road, is added to the map 3101. High-level roads and underground roads may be specified by height from the ground level of the site and may be classified into a plurality of groups by height. Since the first road 3104 and the second road 3102 are ground roads, the first road 3104 and the second road 3102 intersect each other at a grade crossing 3103. The high-level road 3105 and the first road 3104 cross each other at a grade separation 3106.

Road information, not shown, on roads on the same level is subjected to a skeletal line extraction and connection information decision as described in connection with the first embodiment to extract information, not shown, on three-branch joints and four-branch joints. Road information about the roads on all the levels are subjected to skeletal line extraction and connection information decision to extract information, not shown, on three-branch joints and four-branch joints. Information on the grade separation can be obtained from the difference between the former and the latter information.

After the information about all the roads including the new roads has been entered into the map 3101, information indicating the grade crossing 3103 can be obtained because the first road 3104 and the second road 3102 are on the ground level, and information indicating the grade separation 3106 can be obtained because the high-level road 3105 is above the ground level and the first road 3104 is on the ground level. Thus, the algorithm employed in the first embodiment in processing the x-ray image can be applied to processing road map information and design information about wiring patterns.

A tenth embodiment of the present invention will be described hereinafter.

The tenth embodiment is a wiring pattern inspecting system for carrying out the foregoing methods of inspecting wiring patterns and methods of processing information about images or the like. The foregoing methods of inspection are carried out by hardware comprising a logic cell array (LCA) capable of selectively carrying out different processes and of flexibly coping with changes in the test object and inspection conditions. Appropriate circuits are used selectively in accordance with control signals provided by a host computer included in the inspecting system. The necessary circuits may be selected by a circuit changing means to inspect printed wiring boards by an optimum inspecting system according to the types of the printed wiring boards.

As is apparent from the foregoing description, according to the present invention, the wiring pattern inspecting method and the system for carrying out the same is capable of inspecting wiring patterns (circuit patterns) formed in a plurality of layers on a printed wiring board or the like for chipped defects including internal defects, and nodular defects (three-dimensional defects) by using an electromagnetic wave, such as x-rays, or an ultrasonic wave and, of inspecting, in particular, wiring patterns (circuit patterns) comprising wiring lines extended in optional directions and those forming a multilayer printed wiring board for chipped defects with high reliability.

According to the present invention the wiring pattern inspecting method and the system for carrying out the same using x-rays are capable of surely inspecting printed wiring boards for three-dimensional defects including defects on the bottom of wiring patterns (internal defects) and, in particular, of inspecting wiring patterns (circuit patterns) comprising wiring lines extended in optional directions and those forming a multilayer printed wiring board for three-dimensional defects including internal defects with high reliability.

Since wiring patterns (circuit patterns) can be surely inspected for bottom defects (internal defects) by the present invention, high reliability can be secured for test objects (printed wiring boards) provided with a plurality of wiring patterns (circuit patterns) formed in a plurality of layers, whereby the reliability of products employing the test objects (printed wiring boards) inspected by the present invention can be improved.

LIST OF REFERENCE CHARACTERS

1 . . . X-ray tube, 3 . . . Wiring pattern, 5 . . . X-rays, 6 . . . Printed wiring board, 6a . . . Multilayer printed wiring board, 7 . . . Transmitted x-rays, 8 . . . X-ray image intensifier, 10 . . . Field, 11 . . . Light receiving surface, 16 . . . Optical image, 17 . . . Mirror, 18 . . . Lens, 19 . . . Shutter, 20 . . . CCD camera, 22 . . . X-stage, 23 . . . Y-stage, 24 . . . Z-axis (Z-stage), 25 . . . Controller, 26 . . . Defect data output unit, 27 . . . Image processing unit, 29 . . . A/D converter, 30 . . . Level converter, 31 . . . Shading correcting circuit, 32 . . . Fluorescent distribution correcting circuit, 35 . . . Defect detecting and processing circuit (Defect detecting and processing means), 37 . . . Binarizing circuit, 40 . . . Skeletal image extracting circuit, 41 . . . Skeletal line of single-layer wiring pattern, 42 . . . Skeletal line of double-layer wiring pattern, 43 . . . Connection information extracting circuit, 44 . . . End point extracting circuit, 45 . . . Three-branch joint extracting circuit, 46 . . . Four-branch joint extracting circuit, 47 . . . End point extracting circuit, 48 . . . Isolated point extracting circuit, 49 . . . End point signal, 50 . . . Three-branch joint signal, 51 . . . Four-branch joint signal, 52 . . . End point signal, 53 . . . Isolated point signal, 54 . . . Connection information decision circuit, 55, 56, 57 . . . OR circuits, 201 . . . Portion of printed wiring board 6, 202 . . . Base board, 206 . . . Back wiring pattern, 207 . . . Pad, 211, 212, 213, 214, 215 . . . Defects (Chipped defects), 301 . . . Image of base board, 302 . . . Portions of the image corresponding to the wiring pattern, 303 . . . Portions of the image corresponding to superposed portions of the two wiring patterns, 304, 305 . . . Scanning lines, 311 . . . X-ray image of defect 211, 312 . . . X-ray image of defect 212, 313 . . . X-ray image of defect 213, 314 . . . X-ray image of defect 214, 315 . . . X-ray image of defect 215, 2701 . . . Connection information decision preprocessing circuit, 2704 . . . Connection information deciding circuit, 2801 . . . Nodular defect

What is claimed is:

1. A method for inspecting a defect of wiring patterns of different layers in a multilayer wiring board comprising the steps of:

irradiating the multilayer wiring board which is provided with the multilayer wiring patterns;

detecting a gray scale image signal corresponding to the thickness of the multilayer wiring patterns including a superposed section which includes a plurality of superposed wiring patterns in the different layers;

extracting a plurality of binary image signals which indicate a plurality of gray scale values by binarizing the gray scale image signal with each of the gray scale values, the number of the plurality of gray scale values corresponding to the number of superposed wiring patterns in the different layers;

extracting three-branch point information and four-branch point information from a first one of the extracted binary image signals;

extracting end point information and isolated point information from a second one of the extracted binary image signals;

inspecting as an open defect of the wiring patterns when the end point information is not logically extracted in a neighborhood where the three-branch point information is logically extracted by comparing the extracted end point information of the second one of the binary image signals and the extracted three-branch point information of the first one of the binary image signals;

inspecting as an open defect of the wiring patterns when the three-branch point information is not logically extracted in a neighborhood where the end point information is logically extracted by comparing the extracted three-branch point information of the first one of the binary image signals and the extracted end point information of the second one of the binary image signals;

inspecting as an open defect of the wiring patterns when the isolated point information is not logically extracted in a neighborhood where the four-branch point information is logically extracted by comparing the extracted isolated point information of the second one of the binary image signals and the extracted four-branch point information of the first one of the binary image signals;

inspecting as an open defect of the wiring patterns section when the four-branch point information is not logically extracted in a neighborhood where the isolated point information is logically extracted by comparing the extracted four-branch point information of the first one of the binary image signals and the extracted isolated point information of the second one of the binary image signals; and wherein the second one of the extracted binary image signals represents overlapped areas of the wiring patterns in the different layers.

2. A method according to claim 1, wherein the irradiating step comprises irradiating with X-rays.

3. A method for inspecting a defect of wiring patterns of different layers according to claim 2, wherein said step of detecting the gray scale image signal comprises a step of detecting the gray scale image signal which is transmitted through the multilayer wiring board by irradiating the X-rays.

4. A method for inspecting a defect of wiring patterns of different layers in a multilayer wiring board comprising the steps of:
 irradiating the multilayer wiring board which is provided with the multilayer wiring patterns;
 detecting a gray scale image signal corresponding to the thickness of the multilayer wiring patterns including a superposed section which includes a plurality of superposed wiring patterns in different layers;
 extracting a plurality of binary image signals which indicate a plurality of gray scale values by binarizing the gray scale image signal with each of the gray scale values, the number of the plurality of gray scale values corresponding to the number of superposed wiring patterns in different layers;
 converting each of said extracted plurality of binary image signals to one of a plurality of skeletal binary image signals representing skeletal lines;
 extracting three-branch point information and four-branch point information from a first one of the converted skeletal binary image signals;
 extracting end point information and isolated point information from a second one of the converted skeletal binary image signals;
 inspecting as an open defect of the wiring patterns when the end point information is not logically extracted in a neighborhood where the three-branch point information is logically extracted by comparing the extracted end point information of the second one of the skeletal binary image signals and the extracted three-branch point information of the first one of the skeletal binary image signals;
 inspecting as an open defect of the wiring patterns when the three-branch point information is not logically extracted in a neighborhood where the end point information is logically extracted by comparing the extracted three-branch point information of the first one of the skeletal binary image signals and the extracted end point information of the second one of the skeletal binary image signals;
 inspecting as an open defect of the wiring patterns when the isolated point information is not logically extracted in a neighborhood where the four-branch point information is logically extracted by comparing the extracted isolated point information of the second one of the skeletal binary image signals and the extracted four-branch point information of the first one of the skeletal binary image signals;
 inspecting as an open defect of the wiring patterns section when the four-branch point information is not logically extracted in a neighborhood where the isolated point information is logically extracted by comparing the extracted four-branch point information of the first one of the skeletal binary image signals and the extracted isolated point information of the second one of the skeletal binary image signals; and
 wherein the second one of the converted binary image signals represents overlapped areas of the wiring patterns.

5. A method according to claim 4, wherein the irradiating step comprises irradiating with X-rays.

6. A method for inspecting a defect of wiring patterns of different layers according to claim 5, wherein said step of detecting the gray scale image signal comprises a step of detecting the gray scale image signal which is transmitted through the multilayer wiring board by irradiating the X-rays.

7. A method for inspecting a defect of a wiring patterns of different layers in a multilayer wiring board comprising the steps of:
 irradiating the multilayer wiring board which is provided with multilayer wiring patterns;
 detecting a gray scale image signal corresponding to the thickness of the multilayer wiring patterns including a superposed section which includes a plurality of superposed wiring patterns in different layers;
 extracting a plurality of binary image signals which indicate a plurality of gray scale values by binarizing the gray scale image signal with each of the gray scale values, the plurality of gray scale values corresponding to the number of superposed wiring patterns in the different layers;
 extracting three-branch point information and four-branch point information from a first one of the extracted binary image signals;
 extracting end point information and isolated point information from a second one of the extracted binary image signals; and
 inspecting an open defect of wiring patterns by examining connection relations between one of the extracted three-branch point information and four-branch point information of the first one of the binary image signals, and one of the extracted end point information and the isolated point information of the second one of the binary image signals.

8. A method according to claim 7, wherein the irradiating step comprises irradiating with X-rays.

9. A method for inspecting a defect of wiring patterns of different layers according to claim 8, wherein said step of detecting the gray scale image signal comprises a step of detecting the gray scale image signal which is transmitted from the multilayer wiring board by irradiating the X-rays.

10. A wiring pattern inspecting system for inspecting a defect of wiring patterns of different layers in a multilayer wiring board having multilayer wiring patterns comprising:
 an irradiation unit which irradiates the multilayer wiring board;
 a detecting unit which detects a gray scale image signal corresponding to the thickness of the wiring patterns including a superposed section which includes a plurality of superposed wiring patterns in different layers;
 a plurality of binary circuits which extract a plurality of binary image signals which indicate a plurality of gray scale values by binarizing the gray scale image signal with each of the gray scale values, the number of the plurality of gray scale values corresponding to the number of the superposed wiring patterns in different layers;
 a connection information extracting circuit which extracts three-branch point information and four-branch point information from a first one of the extracted binary image signals representing a small superposed number, and for extracting end point information and isolated point information from a second one of the extracted binary image signals representing a larger superposed number; and
 a defect decision means which inspects as an open defect of the wiring patterns when the end point information is not logically extracted in a neighborhood where the three-branch point information is logically extracted by comparing the extracted end point information of the second one of the binary image signals and the extracted three-branch point information of the first one of the binary image signals, and which inspects as an open defect of the wiring patterns when the three-branch point information is not logically extracted in a neighborhood where the end point information is logically extracted by comparing the extracted three-branch point information of the first one of the binary image signals and the extracted end point information of the second one of the binary image signals, and which inspects as an open defect of the wiring patterns when the isolated point information is not logically extracted in a neighborhood where the four-branch point information is logically extracted by comparing the extracted isolated point information of the second one of the binary image signals and the extracted four-branch point information of the first one of the binary image signals, and which inspects as an open defect of the wiring patterns section when the four-branch point information is not logically extracted in a neighborhood where the isolated point information is logically extracted by comparing the extracted four-branch point information of the first one of the binary image signals and the extracted isolated point information of the second one of the binary image signals.

11. A wiring pattern inspecting system according to claim 10, wherein said irradiation unit is an X-ray irradiation unit.

12. A wiring pattern inspecting system according to claim 10, wherein said detecting unit comprises means for detecting the gray scale image signal which is transmitted from said multilayer wiring board by irradiating the X-rays.

13. A method for inspecting a defect of a wiring patterns of different layers in a multilayer wiring board comprising the steps of:
  irradiating the multilayer wiring board which is provided with multilayer wiring patterns;
  detecting a gray scale image signal corresponding to the thickness of the multilayer wiring patterns including a superposed section which includes a plurality of superposed wiring patterns in the different layers;
  extracting a plurality of binary image signals which indicate a plurality of gray scale values by binarizing the gray scale image signal with each of the gray scale values, the number of the plurality of gray scale values corresponding to the number of superposed wiring patterns in the different layers;
  respectively converting said extracted plurality of binary image signals to a plurality of skeletal binary image signals representing skeletal lines;
  extracting three-branch point information and four-branch point information from a first one of the converted skeletal binary image signals;
  extracting end point information and isolated point information from a second one of the skeletal binary image signals;
  inspecting an open defect of wiring patterns by examining connection relations between one of the extracted three-branch point information and four-branch point information of the first one of the converted skeletal binary image signals and one of the extracted end point information and the isolated point information of the second one of the converted skeletal binary image signals; and
  wherein the second one of the converted skeletal binary image signals represents overlapped areas of the wiring patterns in the different layers.

14. A method for inspecting a defect of wiring patterns of different layers according to claim 13, wherein the irradiating step comprises irradiating with X-rays.

15. A method for inspecting a defect of wiring patterns of different layers according to claim 14, wherein said step of detecting the gray scale image signal comprises a step of detecting the gray scale image signal which is transmitted through the multilayer wiring board by irradiating the X-rays.

16. A wiring pattern inspecting system for inspecting a defect of a wiring pattern in a multilayer wiring board having a multilayer wiring pattern comprising:
  an irradiation unit which irradiates the multilayer wiring board;
  a detecting unit which detects a gray scale image signal corresponding to the thickness of the wiring pattern including a superposed section which includes a plurality of superposed wiring pattern layers;
  a plurality of binary circuits which extract a plurality of binary image signals which indicate a plurality of gray scale values by binarizing the gray scale image signal with each of the gray scale values, the number of the plurality of gray scale values being correspondent to the number of the superposed wiring pattern layers;
  a plurality of converting circuits to respectively convert said extracted plurality of binary image signals to a plurality of skeletal binary image signals representing skeletal lines;
  a connection information extracting circuit which extracts three-branch point information and four-branch point information from a first one of the converted skeletal binary image signals representing a small superposed number, and for extracting end point information and isolated point information from a second one of the converted skeletal binary image signals representing a larger superposed number; and
  a defect decision unit which inspects as a defect of the wiring pattern when the end point information is not extracted in a neighborhood where the three-branch point information is extracted by comparing the extracted end point information of the second skeletal binary image signal and the extracted three-branch point information of the first skeletal binary image signal, and for inspecting as a defect of the wiring pattern when the three-branch point information is not extracted in a neighborhood where the end point information is extracted by comparing the extracted three-branch point information of the first skeletal binary image signal and the extracted end point information of the second skeletal binary image signal, and for inspecting as a defect of the wiring pattern when the isolated point information is not extracted in a neighborhood where the four-branch point information is extracted by comparing the extracted isolated point information of the second skeletal binary image signal and the extracted four-branch point information of the first skeletal binary image signal, and for inspecting as a defect of the wiring pattern section when the four-branch point information is not extracted in a neighborhood where the isolated point information is extracted by comparing the extracted four-branch point information of the first skeletal binary image signal and the extracted isolated point information of the second skeletal binary image signal.

17. A wiring pattern inspecting system for inspecting a defect of wiring patterns of different layers according to claim 16, wherein said irradiation unit is an X-ray irradiation unit.

18. A wiring pattern inspecting system according to claim 16, wherein said detecting unit comprises means for detecting the gray scale image signal which is transmitted from said multilayer wiring board by irradiating the X-rays.

19. A wiring pattern inspecting system for inspecting a defect of a wiring pattern in a multilayer wiring board having a multilayer wiring pattern comprising:
   an irradiation unit which irradiates the multilayer wiring board;
   a detecting unit which detects a gray scale image signal corresponding to the thickness of the wiring pattern including a superposed section which includes a plurality of superposed wiring pattern layers;
   a plurality of binary circuits which extracts a plurality of binary image signals which indicate a plurality of gray scale values by binarizing the gray scale image signal with each of the gray scale values, the number of the plurality of gray scale values being correspondent to the number of the superposed wiring pattern layers;
   a connection information extracting circuit which extracts three-branch point information and four-branch point information from a first one of the extracted first binary image signals representing a small superposed number, and for extracting end point information and isolated point information from a second one of the extracted binary image signals representing a larger superposed number; and
   a defect decision unit which inspects a defect of the wiring pattern by examining connection relations between one of the extracted three-branch point information and four-point branch information of the first binary image signal, and one of the extracted end point information and the isolated point information of the second binary image signal.

20. A wiring pattern inspecting system for inspecting a defect of wiring patterns of different layers according to claim 19, wherein said irradiation unit is an X-ray irradiation unit.

21. A wiring pattern inspecting system according to claim 20, wherein said detecting unit comprises means for detecting a gray scale image signal which is transmitted from said multilayer wiring board by irradiating the X-rays.

22. A wiring pattern inspecting system for inspecting a defect of a wiring pattern in a multilayer wiring board having a multilayer wiring pattern comprising:
   an irradiation unit which irradiates the multilayer wiring board;
   a detecting unit which detects a gray scale image signal corresponding to the thickness of the wiring pattern including a superposed section which includes by a plurality of superposed wiring pattern layers;
   a plurality of binary circuits which extract a plurality of binary image signals which indicate a plurality of gray scale values by binarizing the gray scale image signal with each of the gray scale values, the number of the plurality of gray scale values being correspondent to the number of superposed wiring pattern layers;
   a converting circuit which respectively converts said extracted plurality of binary image signals to a plurality of skeletal binary image signals representing skeletal lines;
   a connection information extracting circuit which extracts three-branch point information and four-point branch information from the converted first skeletal binary image signal representing a small superposed number, and for extracting end point information and isolated point information from the converted second skeletal binary image signal representing a larger superposed number; and a defect decision unit which inspects a defect of the wiring pattern by examining connection relations between one of the extracted three-branch point information and four-point branch point information of the first skeletal binary image signal, and one of the extracted end point information and the isolated point information of the second skeletal binary image signal.

23. A wiring pattern inspecting system for inspecting a defect of wiring patterns of different layers according to claim 22, wherein said irradiation unit is an X-ray irradiation unit.

24. A wiring pattern inspecting system according to claim 23, wherein said detecting unit comprises means for detecting a gray scale image signal which is transmitted from said multilayer wiring board by irradiating the X-rays.

25. A method for inspecting a defect of wiring patterns of different layers in a multilayer wiring board comprising the steps of:
   irradiating the multilayer wiring board which is provided with multilayer wiring patterns;
   detecting a gray scale image signal corresponding to the thickness of the multilayer wiring patterns including a superposed section which includes a plurality of superposed wiring patterns in the different layers;
   extracting a plurality of binary image signals which indicate a plurality of gray scale values by binarizing the gray scale image signal with each of the gray scale values, the number of the plurality of gray scale values corresponding to the number of superposed wiring patterns in the different layers;
   extracting branch number information in a neighborhood of a selected location on the wiring patterns in the different layers for each of said binary image signals; and
   determining as an open defect when a relation between a total branch number and a superposed number of the wiring patterns in the different layers at said selected location of the wiring patterns is different from a previously determined wiring pattern rule, said total branch number being obtained by adding an extracted branch number of each of said binary image signals at said selected location of the wiring patterns in the different layers.

26. A method for inspecting a defect of wiring patterns of different layers according to claim 25, wherein the irradiating step comprises irradiating with X-rays.

27. A method for inspecting a defect of a wiring patterns of different layers in a multilayer wiring board comprising the steps of:
   irradiating the multilayer wiring board which is provided with multilayer wiring patterns;
   detecting a gray scale image signal corresponding to the thickness of the multilayer wiring pattern including a superposed section which includes a plurality of superposed wiring patterns in the different layers;
   extracting a plurality of binary image signals which indicate a plurality of gray scale values by binarizing the gray scale image signal with each of the gray scale values, the number of the plurality of gray scale values corresponding to the number of superposed wiring patterns in the different layers;
   extracting branch number information in the neighborhood of a selected location on the wiring patterns in different layers for each of said binary image signals; and
   determining as an open defect when a total branch number at said selected location of the wiring patterns in different layers is different from double the superposed number of the wiring patterns in the different layers at said selected location of the wiring patterns, said total branch number being obtained by adding the extracted branch number of each of said binary image signals at said selected location of the wiring patterns in the different layers.

28. A method for inspecting defect of a wiring patterns of different layers according to claim 27, wherein the irradiating step comprises irradiating with X-rays.

29. A wiring pattern inspecting system for inspecting a defect of wiring patterns of different layers in a multilayer wiring board having multilayer wiring patterns comprising:

an irradiation unit which irradiates the multilayer wiring board;

a detecting unit which detects a gray scale image signal corresponding to the thickness of the wiring patterns including a superposed section which includes a plurality of superposed wiring patterns in the different layers;

a plurality of binary circuits which extract a plurality of binary image signals which indicate a plurality of gray scale values by binarizing the gray scale image signal with each of the gray scale values, the number of the plurality of gray scale values corresponding to the number of the superposed wiring patterns in the different layers;

a connection information extracting circuit which extracts branch number information in a neighborhood of a selected location of the wiring pattern layers for each of said binary image signals; and a defect decision unit which determines a defect when a relation between a total branch number and the superposed number of the wiring patterns in the different layers on said selected location of the wiring patterns in the different layers is different from a previously determined wiring pattern rule, said total branch number being obtained by adding the extracted branch number of each of said binary image signals at said predetermined location of the wiring patterns in the different layers.

30. A wiring pattern inspection system for inspecting a defect of wiring patterns of different layers according to claim 29, wherein said irradiation unit is an X-ray irradiation unit.

31. A wiring pattern inspecting system for inspecting a defect of wiring patterns of different layers in a multilayer wiring board having a multilayer wiring pattern comprising:

an irradiation unit which irradiates the multilayer wiring board;

a detecting unit which detects a gray scale image signal corresponding to the thickness of the wiring pattern including a superposed section which includes a plurality of superposed wiring patterns in the different layers;

a plurality of binary circuits which extract a plurality of binary image signals which indicate a plurality of gray scale values by binarizing the gray scale image signal with each of the gray scale values, the number of the plurality of gray scale values corresponding to the number of the superposed wiring patterns in the different layers;

a connection information extracting circuit which extracts branch number information in a neighborhood of a selected location of the wiring patterns in the different layers for each of said binary image signals; and a defect decision unit which determines a defect when a total branch number at said selected location of the wiring patterns in the different layers is different from double the superposed number of the wiring patterns in the different layers at said selected location of the wiring patterns in the different layers, said total branch number being obtained by adding the extracted branch number of each of said binary image signals at said selected location of the wiring patterns in the different layers.

32. A wiring pattern inspecting system for inspecting a defect of a wiring pattern of different layers, according to claim 31, wherein said irradiation unit is an X-ray irradiation unit.

* * * * *